United States Patent
Cheng et al.

(10) Patent No.: US 8,946,365 B2
(45) Date of Patent: *Feb. 3, 2015

(54) LOW MOLECULAR WEIGHT POLYSTYRENE RESIN AND METHODS OF MAKING AND USING THE SAME

(71) Applicant: Eastman Chemical Company, Kingsport, TN (US)

(72) Inventors: Wei Min Cheng, Pittsburgh, PA (US); Puthenkovilakom Rajesh Raja, Kingsport, TN (US); George Joseph Kutsek, South Park, PA (US); John B. Penn, Pleasant Hills, PA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,320

(22) Filed: Jan. 14, 2013

(65) Prior Publication Data

US 2013/0184425 A1 Jul. 18, 2013

Related U.S. Application Data

(60) Provisional application No. 61/587,681, filed on Jan. 18, 2012.

(51) Int. Cl.
| | |
|---|---|
| C08F 4/00 | (2006.01) |
| C08F 12/02 | (2006.01) |
| C09J 125/06 | (2006.01) |
| C08F 112/08 | (2006.01) |
| C08F 8/04 | (2006.01) |

(52) U.S. Cl.
CPC ............. C09J 125/06 (2013.01); C08F 112/08 (2013.01); C08F 8/04 (2013.01)
USPC .......................................... 526/237; 526/346

(58) Field of Classification Search
CPC .......... C08F 112/08; C08F 8/04; C09J 125/06
USPC ................................................ 526/346, 237
See application file for complete search history.

(56) References Cited

U.S. PATENT DOCUMENTS

| | | | |
|---|---|---|---|
| 2,468,748 A * | 5/1949 | Gerald et al. ................ | 106/252 |
| 2,824,860 A | 2/1958 | Aldridge et al. | |
| 2,911,395 A | 11/1959 | Small | |
| 3,040,009 A | 6/1962 | Wadsworth et al. | |
| 3,505,261 A | 4/1970 | Battersby | |
| 3,554,940 A | 1/1971 | Arakawa et al. | |
| 3,577,398 A | 5/1971 | Pace et al. | |
| 3,701,760 A | 10/1972 | Hagemeyer, Jr. et al. | |
| 3,784,530 A | 1/1974 | Osborn et al. | |
| 3,926,878 A | 12/1975 | Shimizu et al. | |
| 4,008,360 A | 2/1977 | Kudo et al. | |
| 4,048,124 A | 9/1977 | Ishikawa et al. | |
| 4,078,132 A | 3/1978 | Lepert | |
| 4,102,834 A | 7/1978 | Morimoto et al. | |
| 4,239,858 A | 12/1980 | Serlin | |
| 4,292,221 A | 9/1981 | Malatesta | |
| 4,330,655 A | 5/1982 | Bullard | |
| 4,358,574 A | 11/1982 | Hughes | |
| 4,391,961 A | 7/1983 | Small et al. | |
| 4,414,346 A | 11/1983 | Jagisch et al. | |
| 4,482,688 A | 11/1984 | Schluenz | |
| 4,486,563 A | 12/1984 | Jagisch et al. | |
| 4,513,130 A | 4/1985 | Mizui et al. | |
| 4,514,554 A | 4/1985 | Hughes et al. | |
| 4,629,766 A | 12/1986 | Malatesta et al. | |
| 4,714,749 A | 12/1987 | Hughes et al. | |
| 4,952,639 A | 8/1990 | Minomiya et al. | |
| 4,959,412 A | 9/1990 | Arter et al. | |
| 4,992,157 A | 2/1991 | Bricker et al. | |
| 5,021,499 A | 6/1991 | Tochinai et al. | |
| 5,023,304 A | 6/1991 | Takeuchi et al. | |
| 5,037,907 A | 8/1991 | Imabayashi et al. | |
| 5,115,066 A | 5/1992 | Zimmermann et al. | |
| 5,459,193 A | 10/1995 | Anderson et al. | |
| 5,491,214 A | 2/1996 | Daughenbaugh et al. | |
| 5,656,698 A | 8/1997 | Hentges et al. | |
| 5,663,470 A | 9/1997 | Chen et al. | |

(Continued)

FOREIGN PATENT DOCUMENTS

| | | |
|---|---|---|
| CA | 1016285 A1 | 8/1977 |
| EP | 0131460 A1 | 1/1985 |

(Continued)

OTHER PUBLICATIONS

"Low Molecular Weight Polystyrene (LMPS)", http://polychemltd.com/LMPS_Details.aspx?Product=LMPS, (2012-2013).

PCT International Search Report and Written Opinion dated Mar. 22, 2013 for International Application No. PCT/US2013/21805.

PCT International Search Report and Written Opinion dated Mar. 2, 2013 for International Application No. PCT/US2013/21812.

Copending U.S. Appl. No. 13/740,332, filed Jan. 14, 2013, Wei-Min Cheng, et al.

ASTM E28 "Standard Test Methods for Softening Point of Resins Derived from Naval Stores by Ring-and-Ball Apparatus" Published Jun. 2009.

ASTM D611 "Standard Test Methods for Aniline Point and Mixed Aniline Point of Petroleum Products and Hydrocarbon Solvents" Published Nov. 2012.

(Continued)

*Primary Examiner* — William Cheung
(74) *Attorney, Agent, or Firm* — James K. Leonard; Polly C. Owen

(57) ABSTRACT

A low z-average molecular weight, high softening point polystyrene resin having a narrow molecular weight distribution, as well as methods of making and using the same, are provided. The use of an inert solvent and/or the order of addition of reactants during polymerization may contribute to the unique properties of the final homopolymeric resin. The polystyrene resin can be partially or fully hydrogenated and may have particular use as a tackifying agent in a variety of hot melt adhesive and rubber compositions.

14 Claims, 6 Drawing Sheets

(56) References Cited

U.S. PATENT DOCUMENTS

| | | |
|---|---|---|
| 5,670,577 A | 9/1997 | Dawson, Jr. |
| 5,693,706 A | 12/1997 | Hentges et al. |
| 5,693,721 A | 12/1997 | Hentges et al. |
| 5,695,837 A | 12/1997 | Everaerts et al. |
| 5,703,162 A | 12/1997 | Anderson |
| 5,705,551 A | 1/1998 | Sasaki |
| 5,714,254 A | 2/1998 | Jacob |
| 5,741,840 A | 4/1998 | Lindquist et al. |
| 5,747,573 A | 5/1998 | Ryan |
| 5,786,418 A | 7/1998 | Strelow et al. |
| 5,817,900 A | 10/1998 | Berrevoets et al. |
| 5,853,874 A | 12/1998 | Jacob |
| 5,854,367 A | 12/1998 | Salvetat et al. |
| 5,869,562 A | 2/1999 | Lindquist et al. |
| 5,874,143 A | 2/1999 | Peloquin et al. |
| 5,916,959 A | 6/1999 | Lindquist et al. |
| 5,928,782 A | 7/1999 | Albrecht |
| 5,939,483 A | 8/1999 | Kueppers |
| 6,008,148 A | 12/1999 | Harris et al. |
| 6,025,071 A | 2/2000 | Cameron et al. |
| 6,103,814 A | 8/2000 | vanDrongelen et al. |
| 6,106,939 A | 8/2000 | Donker et al. |
| 6,133,386 A | 10/2000 | Morrell et al. |
| 6,162,859 A | 12/2000 | Lu et al. |
| 6,162,868 A | 12/2000 | Radigon et al. |
| 6,197,845 B1 | 3/2001 | Janssen et al. |
| 6,218,588 B1 | 4/2001 | Dommisse et al. |
| 6,232,391 B1 | 5/2001 | Sambasivam et al. |
| 6,274,666 B1 | 8/2001 | Dougherty |
| 6,297,309 B1 | 10/2001 | Bauduin et al. |
| 6,310,154 B1 | 10/2001 | Babcock et al. |
| 6,391,960 B1 | 5/2002 | Sambasivam et al. |
| 6,403,743 B1 | 6/2002 | Clark et al. |
| 6,433,069 B1 | 8/2002 | Oeltjen et al. |
| 6,455,627 B1 | 9/2002 | De Keyzer et al. |
| 6,630,536 B2 | 10/2003 | Kuniya et al. |
| 6,653,385 B2 | 11/2003 | Wang et al. |
| 6,710,147 B2 | 3/2004 | Cottman |
| 6,797,193 B2 | 9/2004 | Brown et al. |
| 6,815,509 B2 | 11/2004 | Miyamoto et al. |
| 6,825,291 B2 | 11/2004 | Klosiewicz et al. |
| 6,872,279 B1 | 3/2005 | Kolowrot et al. |
| 6,984,680 B2 | 1/2006 | Quinn |
| 6,984,696 B2 | 1/2006 | Curry et al. |
| 7,015,155 B2 | 3/2006 | Zhou et al. |
| 7,081,498 B2 | 7/2006 | Moeller et al. |
| 7,199,180 B1 | 4/2007 | Simmons et al. |
| 7,332,540 B2 | 2/2008 | Theelen et al. |
| 7,378,481 B1 | 5/2008 | Gong et al. |
| 7,442,739 B1 | 10/2008 | Hatfield |
| 7,595,365 B2 | 9/2009 | Kappes et al. |
| 7,883,671 B2 | 2/2011 | Galewski |
| 8,829,105 B2 | 9/2014 | Cheng et al. |
| 2002/0183465 A1* | 12/2002 | Babcock et al. ............. 526/130 |
| 2007/0054118 A1 | 3/2007 | Tabata et al. |

FOREIGN PATENT DOCUMENTS

| | | | |
|---|---|---|---|
| EP | 0188901 | A2 | 7/1986 |
| EP | 196844 | A2 | 10/1986 |
| EP | 356712 | A1 | 3/1990 |
| EP | 413403 | A1 | 2/1991 |
| EP | 499599 | A2 | 8/1992 |
| EP | 0612824 | A1 | 8/1994 |
| EP | 617053 | A1 | 9/1994 |
| EP | 0666273 | A2 | 8/1995 |
| EP | 697451 | A1 | 2/1996 |
| EP | 725087 | A1 | 8/1996 |
| EP | 0754707 | A2 | 1/1997 |
| EP | 794202 | A1 | 9/1997 |
| EP | 798358 | A1 | 10/1997 |
| EP | 0802251 | A1 | 10/1997 |
| EP | 802251 | A1 | 10/1997 |
| EP | 0842984 | A1 | 5/1998 |
| EP | 936229 | A1 | 8/1999 |
| EP | 943673 | A1 | 9/1999 |
| EP | 1013733 | A1 | 6/2000 |
| EP | 1035143 | A1 | 9/2000 |
| EP | 1245591 | A1 | 10/2002 |
| EP | 1310524 | A1 | 5/2003 |
| EP | 1342765 | A2 | 9/2003 |
| EP | 1553149 | A1 | 7/2005 |
| EP | 1900763 | A1 | 3/2008 |
| JP | 2001164079 | A | 6/2001 |
| JP | 2002037804 | A | 2/2002 |
| JP | 2008231228 | A | 10/2008 |
| WO | WO 90/07145 | A1 | 6/1990 |
| WO | WO 91/07472 | A1 | 5/1991 |
| WO | WO 95/12623 | A1 | 5/1995 |
| WO | WO 95/16755 | A1 | 6/1995 |
| WO | WO 96/23042 | A1 | 8/1996 |
| WO | WO 96/33246 | A1 | 10/1996 |
| WO | WO 97/39075 | A1 | 10/1997 |
| WO | WO 97/48779 | A1 | 12/1997 |
| WO | WO 98/00471 | A1 | 1/1998 |
| WO | WO 98/02498 | A1 | 1/1998 |
| WO | WO 98/03603 | A1 | 1/1998 |
| WO | WO 98/18829 | A1 | 5/1998 |
| WO | WO 99/20708 | A1 | 4/1999 |
| WO | WO 00/04108 | A1 | 1/2000 |
| WO | WO 00/17286 | A1 | 3/2000 |
| WO | WO 0075199 | A1 | 12/2000 |
| WO | WO 01/05856 | A1 | 1/2001 |
| WO | WO 01/05857 | A1 | 1/2001 |
| WO | WO 02/051931 | A1 | 7/2002 |
| WO | WO 03/033612 | A1 | 4/2003 |
| WO | WO 2005/023951 | A1 | 3/2005 |
| WO | WO 2005/071009 | A1 | 8/2005 |
| WO | WO 2005/080461 | A1 | 9/2005 |

OTHER PUBLICATIONS

ASTM D5773 "Standard Test Method for Cloud Point of Petroleum Products (Constant Cooling Rate Method)" Published Aug. 2010.
ASTM D4498 "Standard Test Method for Heat-Fail Temperature in Shear of Hot Melt Adhesives" Published Jun. 2007.
ASTM D6166 Standard Test Method for Color of Pine Chemicals and Related Products (Instrumental Determination of Gardner Color) Published Dec. 2012.
USPTO Office Action dated Jan. 16, 2014 in copending U.S. Appl. No. 13/740,322.
USPTO Office Action dated Jan. 16, 2014 in co-pending U.S. Appl. No. 13/740,322.
USPTO Notice of Allowance dated Jun. 26, 2014 in co-pending U.S. Appl. No. 13/740,322.

* cited by examiner

US 8,946,365 B2

LOW MOLECULAR WEIGHT POLYSTYRENE RESIN AND METHODS OF MAKING AND USING THE SAME

RELATED APPLICATIONS

This application claims priority to U.S. Provisional Application Ser. No. 61/587,681 filed on Jan. 18, 2012, the disclosures of which are incorporated herein by reference to the extent they do not contradict the statements herein.

FIELD OF THE INVENTION

This invention relates to processes and systems for making low molecular weight polystyrene resins. In another aspect, this invention relates to the use of such resins, particularly as components of adhesive compositions.

BACKGROUND

Hydrocarbon resins are widely useful in a variety of applications, including as modifiers in polymeric systems, or as additives in adhesives, rubber, hot melt coatings, printing inks, flooring materials, and other systems. In many applications, selection of a hydrocarbon resin having specific properties may be important in order to ensure compatibility of the resin with the other components and/or in order to produce a polymeric system having a desired thermal stability, range of mechanical properties, and/or degree of processability. For example, in some applications, resins having a high softening point with narrow molecular weight distribution may be required. In the past, this type of resin was often produced via copolymerization of a plurality of petroleum compounds, such as those components of cracked petroleum distillate, turpentine fractions from natural product distillation, coal tar C10 olefins, and/or pure aromatic monomers resulting from Friedel-Crafts reactions of aromatic compounds. Styrene is a less expensive and more available pure monomer. It is, however, difficult to produce a homopolymer of styrene having a desired high softening point with reasonably low z-average molecular weight and narrow polydispersity.

Thus, a need exists for a hydrocarbon-based resin having a narrow molecular weight distribution, a low z-average molecular weight, and a high softening point. The resin should be widely applicable and useful in a number of end use applications, including, for example, as a tackifier in adhesive compositions.

SUMMARY

One embodiment of the present invention concerns a process for producing a styrenic resin comprising: (a) combining at least a solid acid catalyst, an inert solvent, and styrene to thereby form a reaction mixture; and (b) polymerizing at least a portion of the styrene in the reaction mixture to thereby produce a polystyrene polymer having a Ring & Ball softening point of at least 70° C. and a z-average molecular weight (Mz) of not more than 4,000 dalton, wherein the inert solvent has an aromatic hydrogen content of not more than 10 percent, as measured by proton NMR.

Another embodiment of the present invention concerns a process for producing a styrenic resin comprising: (a) combining at least a solid acid catalyst, a solvent, and one or more monomers to thereby form a reaction mixture, wherein styrene makes up at least 95 weight percent of the one or more monomers; and (b) polymerizing at least a portion of the styrene in the reaction mixture to thereby provide a polystyrene polymer having Ring & Ball softening point of at least 70° C. and a polydispersity index of not more than 2.0.

Yet another embodiment of the present invention concerns a styrenic resin comprising not more than 5 weight percent of moieties other than styrenic moieties, the styrenic resin having a Ring & Ball softening point of at least 70° C., a z-average molecular weight (Mz) of not more than 3,500 dalton, and a polydispersity index of not more than 2.0.

Still another embodiment of the present invention concerns an adhesive composition comprising: (a) at least 15 weight percent and not more than 85 weight percent of one or more adhesive base polymers; (b) at least 5 weight percent and not more than 75 weight percent of a tackifier; (c) not more than 35 weight percent of an oil; (d) not more than 40 weight percent of one or more waxes; and (e) not more than 10 weight percent of one or more additional components, wherein the tackifier comprises a styrenic resin having a Ring & Ball softening point of at least 70° C. and not more than 125° C., a z-average molecular weight (Mz) of not more than 4,000 dalton, and a polydispersity index of not more than 2.0, wherein the styrenic resin is an at least partially hydrogenated polystyrene resin comprising not more than 5 weight percent of moieties other than styrenic moieties.

BRIEF DESCRIPTION OF THE DRAWINGS

Various embodiments of the present invention are described in detail below with reference to the attached drawing figures, wherein.

DETAILED DESCRIPTION

Processes and systems for producing low z-average molecular weight, high softening point styrenic resins according to embodiments of the present invention are provided. As used herein, the term "styrenic resin" broadly refers to an unhydrogenated or at least partially (i.e., partially or fully) hydrogenated polystyrene resin. One or more inventive styrenic resins can be particularly suitable for a variety of end use applications, including, for example, use as a tackifying resin in several types of adhesive or rubber compositions. Details regarding the inventive styrenic resins, as well as methods of making and using the same, will now be discussed in detail, with general reference to the Figures.

Figure 1:
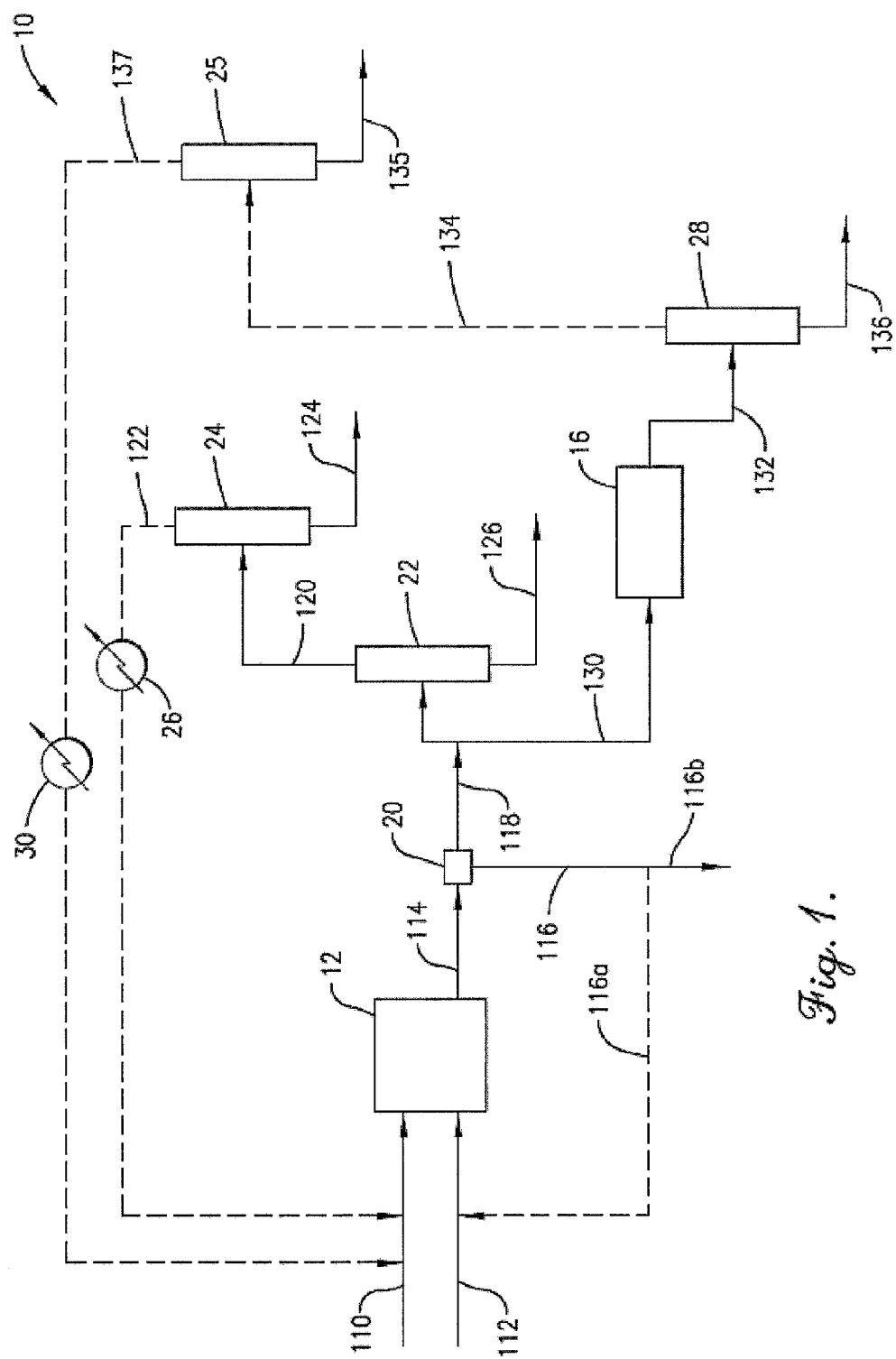
FIG. 1 is a schematic representation of a polystyrene production facility configured according to one embodiment of the present invention operable to produce a polystyrene resin as described herein.

Referring initially to FIG. 1, a schematic representation of a polystyrene production facility 10 configured according to one embodiment of the present invention is provided. As shown in FIG. 1, a monomer feed stream in conduit 110 and a catalyst-containing feed stream in conduit 112 can be combined with a solvent in a polymerization reactor 12. The resulting resin can then optionally be at least partially, or fully, hydrogenated in a hydrogenation zone 16. One or more styrenic resins produced according to various embodiments described herein can have a z-average molecular weight (Mz) of not more than about 4,000 dalton, not more than about 3,500 dalton, not more than about 3,000 dalton, not more than about 2,500 dalton, not more than about 2,300 dalton, or not more than about 2,200 dalton, can also exhibit an unexpectedly high Ring & Ball softening point (ASTM E-28) of at least about 70° C., at least about 80° C., at least about 85° C., or at least about 90° C. Additional characteristics of the inventive styrenic resins, as well as uses thereof, will be discussed in detail shortly.

According to one embodiment of the present invention, the monomer feed stream in conduit 110 can comprise one or more pure monomers. As used herein, the term "pure monomer" refers to one or more highly-purified monomeric species. In contrast, monomer species such as "C5 monomers" or "C9 monomers" comprise mixtures of multiple monomeric species, typically derived from cracked petroleum or turpentine fractions, which include low concentrations of a plurality of different types of monomers, each having similar boiling ranges and/or molecular weights. Examples of suitable pure monomers can include, but are not limited to, styrene, alpha-methylstyrene (AMS), vinyltoluene, para-methylstyrene, beta-methylstyrene, and combinations thereof. In some embodiments, the pure monomer can be a styrene-based pure monomer and can comprise styrene in an amount of at least about 90 weight percent, at least about 95 weight percent, at least about 98 weight percent, at least about 99 weight percent, or substantially all of the monomer introduced into reactor 12. Consequently, in some embodiments, the polystyrene polymer or styrenic resin can be a polystyrene homopolymer comprising not more than about 5 weight percent, not more than or less than about 2 weight percent, not more than about 1 weight percent, or not more than about 0.5 weight percent of moieties other than styrenic moieties. As used herein, the term "styrenic moieties" refers to one or more moieties derived from styrene and can include unhydrogenated or at least partially hydrogenated moieties of styrene. In other embodiments, two or more of the above-listed pure monomers may be co-polymerized in polymerization reactor 12 to thereby provide a polystyrene copolymer comprising at least about 5 weight percent, at least about 10 weight percent, or at least about 15 weight percent of one or more non-styrenic moieties.

The catalyst-containing feed stream in conduit 112 can comprise any suitable type of solid polymerization catalyst. According to one embodiment of the present invention, the solid polymerization catalyst can comprise a metal oxide solid acid catalyst having an acidity greater than about −3 on the Hammett scale. Examples of suitable metal oxide solid acid catalysts are described in U.S. Pat. Nos. 6,133,386 and 6,310,154, the entireties of which are incorporated herein by reference to the extent not inconsistent with the present disclosure. As used herein, the term "solid acid" refers to any solid which changes the color of a basic Hammett indicator with a $pKI_a<0$. Examples of suitable solid acid catalysts can include, but are not limited to, acid activated clays, silica-alumina, amorphous silica-alumina, Bronsted acid on silica, Bronsted acid on silica-alumina, zeolites, mesoporous silica-alumina, Bronsted acid on mesoporous silica, Bronsted acid on mesoporous silica-alumina, and combinations thereof.

In one embodiment, the acid activated clays may include naturally occurring clay minerals such as kaolinite, bentonite, attapulgite, montmorillonite, clarit, Fuller's earth, hectorite, or beidellite. The montmorillonite can be treated with at least one member selected from the group consisting of sulfuric acid and hydrochloric acid. The acid activated clay may also include synthetic clay. The synthetic clay may include at least one member selected from the group consisting of saponite and hydrotalcite. The acid activated clay may include modified clay such as pillared clay. The pillared clay may include at least one member selected from the group consisting of aluminum oxide pillared clay, cerium modified alumina pillared clay, and metal oxide pillared clay. The acid activated clay may include Bronsted acid on clay, wherein the Bronsted acid includes at least one member selected from the group consisting of hydrofluoric acid, sulfuinc acid, nitric acid, phosphoric acid, and hydrochloric acid. One example of a commercially available solid acid clay catalyst suitable for use in embodiments of the present invention is FILTROL F-22 acid clay catalyst (commercially available from BASF, Iselin, N.J.).

In one embodiment, the solid acid clay catalyst can be treated prior to use in polymerization reactor 12 to remove bound and/or freely-associated water, thereby maximizing catalyst acidity and activity. In one embodiment, the moisture content of the solid acid clay catalyst in conduit 112 can be at least about 1 weight percent, at least about 2 weight percent, or at least about 4 weight percent and/or not more than about 10 weight percent, not more than about 8 weight percent, or not more than about 7 weight percent, based on the total weight of the solid acid clay catalyst in reactor 12. Similarly, the free water content in the monomer feed stream in conduit 110 can be limited to not more than about 500 ppm, not more than about 200 ppm, not more than about 100 ppm, or not more than about 50 ppm, by volume, based on the total volume of the feed stream.

In some embodiments, the monomer feed stream in conduit 110 and/or the catalyst-containing feed stream in conduit 112 can be optionally combined with one or more polymerization solvents prior to, or shortly after, being introduced into reactor 12. When present, the amount of solvent in each stream can be at least about 10 weight percent, at least about 20 weight percent, at least about 35 weight percent and/or not more than about 50 weight percent, not more than about 40 weight percent, or not more than about 30 weight percent, based on the total weight of the stream. The solvent can be any suitable type of polymerization solvent and can include recycled solvent, fresh solvent, or combinations thereof.

In one embodiment, the polymerization solvent can comprise a reactive solvent. As used herein, the terms "reactive solvent" and "reactive polymerization solvent" refer to a solvent that participates in the polymerization reaction. Many reactive solvents have an aromatic hydrogen content exceeding 20 percent. As used herein, the term "aromatic hydrogen content" refers to the ratio of the integration area of aromatic hydrogen to the total hydrogen integration area, as determined by the proton NMR procedure described herein in Example 2. Examples of suitable reactive polymerization solvents can include, but are not limited to, benzene, alkyl-substituted benzenes such as xylene and toluene, and light aromatic petroleum distillates such as "Aromatic A-100" (commercially available from Exxon Mobil Chemical Company), "HiSol 10" (commercially available from Ashland Chemical Inc.), and "Cyclosol 53" (commercially available from Shell Chemical Company).

In another embodiment of the present invention, the polymerization solvent can comprise an inert solvent. As used herein, the terms "inert solvent" and "inert polymerization solvent" refer to a solvent that does not significantly participate in the polymerization reaction. In some embodiments, an inert solvent may have a straight aniline point (ASTM D611-07) of at least about 40° C., at least about 45° C., or at least about 50° C. Although not wishing to be bound by theory, it is hypothesized that, unlike many reactive solvents, the molecular structures of inert solvents may not alkylate the growing polymer chain. Accordingly, it has been unexpectedly discovered that resins polymerized in inert solvents can exhibit a higher-than-expected softening point for a given polymerization temperature as compared to similar resins polymerized in reactive solvents, as further illustrated shortly in Example 1.

Inert solvents can comprise one or more aliphatic hydrocarbon compounds, including, for example, straight-chain aliphatic hydrocarbons such as hexanes, heptanes, octanes, and isomers thereof; cycloaliphatic hydrocarbons including cyclohexanes such tetramethylcyclohexane and trimethylcyclohexane, and isomers thereof; halogen-substituted hydrocarbon compounds, such as methylene chloride; and non-aromatic distillate blends. In some embodiments, an inert solvent may also include a small amount of one or more reactive aromatic hydrocarbon compounds, while still maintaining its non-reactive functionality. For example, in some embodiments, the inert solvent can have an aromatic hydrogen content of not more than about 10 percent, not more than about 7 percent, not more than about 5 percent, not more than about 2 percent, or not more than about 1 percent, as determined by proton NMR procedure as described herein in Example 2. Examples of suitable inert solvents, can include, but are not limited to, mineral spirits such as white spirits, Stoddard solvent, odorless mineral spirits, Rule 66 mineral spirits, Recycled Hydrogenation Solvent (commercially available from Eastman Chemical Company), and combinations thereof.

The monomer and catalyst-containing feed streams in conduits 110 and 112 can be introduced into reactor 12 in any suitable order. In one embodiment, the catalyst or a pre-mixed catalyst/solvent slurry can be introduced into reactor 12, after it has been initially charged with monomer. This addition of catalyst or a catalyst/solvent slurry to the monomer is referred to as "straight addition." In another embodiment, the monomer feed stream in conduit 110 can be added, either incrementally or continuously, to a pre-mixed catalyst/solvent slurry or a fixed bed of pelletized catalyst initially charged or loaded into to polymerization reactor 12. The addition of the monomer to the catalyst or catalyst/solvent slurry can also be referred to as "reverse addition." In some embodiments, the monomer and catalyst-containing feed streams in conduits 110 and 112 can be introduced into polymerization reactor 12 at substantially the same time, (not shown in FIG. 1).

Regardless of the specific reaction sequence employed to combine the catalyst, solvent, and monomer, the resulting reaction mixture in polymerization reactor 12 can have a catalyst loading of at least about 1 weight percent, at least about 1.5 weight percent, at least about 2 weight percent and/or not more than about 10 weight percent, not more than about 7 weight percent, not more than about 5 weight percent, not more than about 4 weight percent, or not more than about 3 weight percent, based on the total weight of monomer introduced into reactor 12. In addition, the combined reaction mixture can have a solvent-to-monomer (or styrene-to-monomer) weight ratio of at least about 30:70, at least about 40:60, or at least 45:55 and/or not more than about 60:40, not more than about 50:50, or not more than about 40:60 during polymerization of the monomer feed. In some embodiments, the combined reaction mixture in polymerization reactor 12 can also include one or more optional components, such as, for example chain transfer agents (or compounds which behave as chain transfer agents). Examples of chain transfer agents and related compounds can include, but are not limited to, isobutylene, 2-methyl-1-butene, 2-methyl-2-butene, dimers or oligomers thereof, and combinations thereof. When present, these additional components can comprise not more than about 10 percent, not more than about 7 percent, not more than about 5 percent, or not more than about 2 percent by weight of the total the combined reaction mixture.

During polymerization, the average temperature of the reaction medium within reactor 12 can be at least about 0° C., at least about 35° C., at least about 40° C., at least about 45° C., at least about 50° C., at least about 55° C., at least about 60° C., at least about 65° C. and/or not more than about 110° C., not more than about 105° C., not more than about 100° C., not more than about 95° C., not more than about 90° C., not more than about 85° C., or not more than about 80° C. In some embodiments, polymerization reactor 12 can be operated substantially isothermally, such that the average reaction temperature changes by not more than about 5° C. or not more than about 2° C. during the duration of the reaction. Any suitable system for controlling the reaction temperature within reactor 12 can be used, including, for example, an external heat exchanger loop, one or more internal cooling coils, and/or a reactor cooling jacket.

The polymerization reaction can be carried out for a sufficient amount of time in order to achieve a desired polystyrene yield. According to one embodiment, the residence time, or reaction time at reaction temperature, can be at least about 30 minutes, at least about 45 minutes, or at least about 1 hour and/or not more than about 8 hours, not more than about 6 hours, or not more than about 4 hours. As a result, the polystyrene yield can be at least about 10 percent, at least about 25 percent, at least about 50 percent, at least about 75 percent, at least about 85 percent, at least about 90 percent, or at least about 95 percent, based on the total monomer fed to reactor 12. The polymerization reaction can be carried out in a continuous, batch, or semi-batch mode and reactor 12 can comprise any suitable type of reactor, including, for example, a fixed bed reactor, a fluidized bed reactor, a continuous stirred tank reactor (CSTR), a plug-flow reactor, a continuous loop reactor, and combinations thereof.

Once complete, the polymerization reaction may be stopped by physically separating the liquid reaction medium from the solid catalyst. In one embodiment depicted in FIG. 1, the reaction mixture withdrawn from polymerization reactor 12 via conduit 114 can pass through a catalyst filter 20, wherein the resin solution, which includes the polystyrene product, unreacted monomer, various reaction by-products, and solvent, can be separated from the solid acid catalyst. As shown in FIG. 1, the liquid-phase resin solution can be routed via conduit 118 to a separation/purification zone, while the solid acid catalyst removed from catalyst filter 20 via conduit 116 can be optionally recycled to polymerization reactor 12 for reuse via conduit 116a. In some embodiments, at least a portion of the separated catalyst may be a single-use catalyst and at least some of the catalyst may be discarded, as illustrated by conduit 116b, after removal from catalyst filter 20.

In one embodiment, polystyrene production system 10 can be configured to produce unhydrogenated polystyrene resin. According to this embodiment, the resin solution removed from catalyst filter 20 can be introduced into a vacuum separation column 22, wherein the solvent and polymerizate oils (i.e., styrenic dimers, trimers, and oligomers, as well as other reaction byproducts) can be separated from the polystyrene product via flash vaporization. The vapor overhead stream, which comprises solvent and oils, withdrawn from vacuum separation column 22 can be subsequently routed via conduit 120 to a solvent recovery column 24, wherein the polymerization solvent can be separated via vacuum flash vaporization from the heavier polymerizate oils. As shown in FIG. 1, at least a portion of the recovered solvent in conduit 122 can be cooled and at least partially condensed via condenser 26 before being recycled to polymerization reactor 12 for subsequent reuse. The oil-rich liquid stream withdrawn from solvent recovery column 24 can be routed for further processing, storage, and/or disposal via conduit 124.

The unhydrogenated polystyrene withdrawn from vacuum separation column 22 via conduit 126 can have unique combinations of physical and/or chemical properties, as discussed briefly above. In particular, the unhydrogenated polystyrene produced according to embodiments of the present invention can exhibit unexpectedly high softening points and low z-average molecular weights with relatively narrow polydispersities. For example, in one embodiment of the present invention, the unhydrogenated polystyrene can have a z-average molecular weight (Mz) of at least about 500 dalton, at least about 1,000 dalton, at least about 1,500 dalton and/or not more than about 4,000 dalton, not more than about 3,500 dalton, not more than about 3,000 dalton, not more than about 2,500 dalton, not more than about 2,300 dalton, or not more than about 2,200 dalton, and a polydispersity index, measured as the ratio of number average molecular weight to weight average molecular weight (Mw/Mn) of at least about 1.1, at least about 1.2, or at least about 1.5 and/or not more than about 3.5, not more than about 3.0, not more than about 2.5, not more than about 2.0, not more than about 1.9, not more than about 1.7, or not more than about 1.65, as determined according to the GPC method described in detail in Example 2.

In the same or other embodiments, the unhydrogenated polystyrene can have a Ring & Ball softening point (ASTM-E28) of at least about 5° C., at least about 30° C., at least about 50° C., at least about 70° C., at least about 75° C., at least about 80° C., at least about 85° C., or at least about 90° C. and/or not more than about 165° C., not more than about 150° C., not more than about 130° C., not more than about 125° C., not more than about 115° C., not more than about 110° C., or not more than about 105° C. This is in contrast to conventional polystyrene, which typically exhibits a lower softening point and/or wider polydispersity at the average molecular weight described above.

In some embodiments of the present invention, polymer production system 10 illustrated in FIG. 1 can additionally, or alternatively, be configured to produce partially or fully hydrogenated polystyrene resin. According to these embodiments, at least a portion, or all, of the resin solution removed from catalyst filter 20 via conduit 118, can be routed via conduit 130 to hydrogenation zone 16, as shown in FIG. 1. In one embodiment wherein the polymerization solvent comprises an aromatic solvent, the polystyrene resin can be separated from the aromatic solvent and then re-dissolved in an aliphatic solvent prior to being hydrogenated (not shown in FIG. 1). In another embodiment wherein the polymerization solvent comprises an inert or aliphatic solvent, the polystyrene can be hydrogenated in the same polymerization solvent (i.e., the polymerization solvent can be utilized as a hydrogenation solvent in hydrogenation zone 16).

Hydrogenation zone 16 can be any system or process capable of at least partially hydrogenating the polymer resin in conduit 130. Examples of suitable hydrogenation systems and processes are described in U.S. Pat. No. 5,491,214, the disclosure of which is incorporated herein by reference to the extent not inconsistent with the present disclosure. In one embodiment, the polystyrene can be hydrogenated at a temperature of at least about 100° C., at least about 150° C., at least about 200° C. and/or not more than about 350° C., not more than about 300° C., or not more than about 250° C. for a reaction time of at least about 10 minutes, at least about 15 minutes, or at least about 20 minutes and/or not more than about 2 hours, not more than about 1.5 hours, or not more than about 1 hour. The pressure in hydrogenation zone can be at least about 200 psig, at least about 500 psig, or at least about 750 psig and/or not more than about 1,500 psig, not more than about 1,250 psig, or not more than about 1,100 psig and can be applied as the reaction mixture is being heated and/or upon achievement of the desired hydrogenation temperature. Examples of suitable hydrogenation catalysts can include, but are not limited to, supported nickel, platinum, palladium, copper/zinc, transition metal oxides, and combinations thereof.

As shown in FIG. 1, the hydrogenated resin solution exiting hydrogenation zone 16 via conduit 132 can subsequently be routed to a solvent recovery column 28, wherein the at least partially hydrogenated polystyrene resin product can be separated from the hydrogenation solvent. In some embodiments, rather than utilizing a separate solvent recovery column 28, vacuum separation column 22 can be operable to process at least a portion of the at least partially hydrogenated polystyrene resin product withdrawn from hydrogenation zone 16 via conduit 132. When column 28 is present, the vapor overhead stream withdrawn via conduit 134 can be subsequently routed to a further solvent recovery column 25, wherein the polymerization solvent can be separated via flash vacuum vaporization from the polymerizate oils. As shown in FIG. 1, the recovered solvent withdrawn from the overhead of further recovery column 25 in conduit 137 can be cooled and at least partially condensed via passage through condenser 30, before being recycled to polymerization reactor 12 for subsequent reuse. The oil-rich liquid stream withdrawn from further solvent recovery column 25 can be routed for further processing, storage, and/or disposal via conduit 135.

The resulting at least partially hydrogenated polystyrene resin withdrawn from hydrogenation zone 16 via conduit 136 can have an aromatic hydrogen content of at least about 2 percent, at least about 5 percent, or at least about 7 percent and/or not more than about 25 percent, not more than about 20 percent, or not more than about 15 percent, as measured by the proton NMR procedure described herein in Example 2. In some embodiments, the polystyrene resin exiting hydrogenation zone 16 may be fully hydrogenated, such that the resin has an aromatic hydrogen content of not more than about 7 percent, not more than about 5 percent, or not more than about 2 percent, as measured by the proton NMR procedure described herein.

In some embodiments, the at least partially hydrogenated polystyrene resin can have a mixed methylcyclohexane aniline point (MMAP) cloud point of at least about 60° C., at least about 70° C., or at least about 80° C. and/or a diacetone alcohol cloud point (DACP) of at least about 30° C., at least about 35° C., or at least about 40° C. and/or not more than about 75° C., not more than about 70° C., or not more than about 65° C. The MMAP and DACP cloud points are determined as described in Example 3, below.

In some embodiment when partially or fully hydrogenated, the polystyrene resin can have a Ring & Ball softening point of at least about 5° C., at least about 75° C., at least about 80° C., at least about 85° C., at least about 90° C., at least about 95° C. and/or not more than about 150° C., not more than about 140° C., not more than about 135° C., not more than about 130° C., not more than about 125° C., not more than about 120° C. The z-average molecular weight of the at least partially hydrogenated polystyrene resin can be at least about 500 dalton, at least about 750 dalton, at least about 1,000 dalton and/or not more than about 4,500 dalton, not more than about 4,000 dalton, not more than about 3,500 dalton, or not more than 3,000 dalton, and the polydispersity (Mw/Mn) can be at least about 1.2 and/or not more than about 3.5, not more than about 3.0, not more than about 2.5, not more than about 2.0, or not more than about 1.9.

In one embodiment of the present invention, one or more of the styrenic resins described above can be used as tackifying resins and/or as part of a tackifying agent in an adhesive composition. In one embodiment, the adhesive composition can be a hot melt adhesive composition selected from the group consisting of hot melt packaging adhesives, hot melt nonwoven adhesives, and hot melt pressure sensitive adhesives. Tables 1-3, below, summarize ranges for the major components of exemplary adhesive compositions prepared according to embodiments of the present invention.

TABLE 1

Major Components of Hot Melt Packaging Adhesive Compositions

| Component | Broad Range | Intermediate Range | Narrow Range |
|---|---|---|---|
| Adhesive Base Polymer(s) | 25 to 80% | 30 to 75% | 35 to 70% |
| Tackifying Agent | 5 to 55% | 10 to 50% | 15 to 45% |
| Oil | | optional | |
| Wax | 1 to 50% | 5 to 45% | 10 to 40% |
| Antioxidant | 0 to 5% | 0 to 3% | 0 to 1% |

TABLE 2

Major Components of Hot Melt Nonwoven Adhesive Compositions

| Component | Broad Range | Intermediate Range | Narrow Range |
|---|---|---|---|
| Adhesive Base Polymer(s) | 15 to 35% | 15 to 30% | 15 to 25% |
| Tackifying Agent | 10 to 70% | 15 to 65% | 20 to 60% |
| Oil | 1 to 30% | 2 to 25% | 5 to 20% |
| Wax | | optional | |
| Antioxidant | 0 to 5% | 0 to 3% | 0 to 1% |

TABLE 3

Major Components of Hot Melt Pressure Sensitive Adhesive Compositions

| Component | Broad Range | Intermediate Range | Narrow Range |
|---|---|---|---|
| Adhesive Base Polymer(s) | 20 to 65% | 25 to 60% | 30 to 55% |
| Tackifying Agent | 10 to 60% | 15 to 55% | 20 to 50% |
| Oil | 1 to 20% | 2 to 15% | 5 to 10% |

TABLE 3-continued

Major Components of Hot Melt Pressure Sensitive Adhesive Compositions

| Component | Broad Range | Intermediate Range | Narrow Range |
|---|---|---|---|
| Wax | | optional | |
| Antioxidant | 0 to 5% | 0 to 3% | 0 to 1% |

As shown in Tables 1-3, the hot melt adhesive compositions formulated according to various embodiments of the present invention can comprise one or more adhesive base polymers in combination with a tackifying agent. The amount of base polymer and tackifying agent can vary depending on the specific type of adhesive formulation. In one embodiment, the adhesive composition can comprise at least about 15 percent, at least about 20 percent, at least about 25 percent, at least about 30 percent, or at least about 35 percent and/or not more than about 80 percent, not more than about 75 percent, not more than about 70 percent, not more than about 65 percent, not more than about 60 percent, not more than about 55 percent, not more than about 35 percent, not more than about 30 percent, or not more than about 25 percent, by weight, of one or more adhesive base polymers, based on the total weight of the adhesive composition.

Examples of suitable adhesive base polymers (also referred to as elastomers or adhesive polymer components) can include, but are not limited to, styrenic block copolymers (SBC), such as, styrene-isoprene-styrene (SIS) copolymers, styrene-butadiene-styrene (SBS) copolymers, styrene-isoprene-butadiene-styrene (SIBS), styrene-ethylene-butylene-styrene (SEBS) copolymers, styrene-ethylene-propylene-styrene (SEPS) copolymers, styrene-butadiene-butylene-styrene (SBBS) copolymers, styrene-ethylene-propylene-styrene (SEPS) copolymers, styrene-ethylene-ethylene-propylene-styrene (SEEPS), styrene-ethylene-propylene (SEP) copolymers, and combinations thereof; metallocene copolymers including polyethylene, polypropylene, and/or polyolefins; amorphous polyalphaolefins (APAO); olefinic polymers and olefinic block copolymers (OBC); ethyl vinyl acetate (EVA); acrylic block copolymers (ABCs); polyesters; and combinations of one or more of the above-listed polymers. Examples of commercially available base polymers can include, but are not limited to, those sold under the trade names ENGAGE, AFFINITY, AFFINITY GA, INFUSE, and VERSIFY (available from Dow Chemical Company, Midland, Mich.); EXACT, LINXAR, VISTAMAXX (available from Exxon Chemical Company, Irving, Tex.); VESTOPLAST (available from Evonik/Degussa, Essen, Germany); REXTAC (available from Rextac/Huntsman, Odessa, Tex.); and NANOSTRENGTH (available from Arkema, King of Prussia, Pa.).

As shown in Tables 1-3, the adhesive composition can include at least about 1 percent, at least about 5 percent, at least about 10 percent, at least about 15 percent, at least about 20 percent and/or not more than about 70 percent, not more than about 65 percent, not more than about 60 percent, not more than about 55 percent, not more than about 50 percent, not more than about 45 percent, by weight, of the total adhesive composition, a tackifying agent. The tackifying agent employed in the hot melt adhesives as described herein can include one or more styrenic resins as described in detail previously. In one embodiment, the tackifying agent can comprise at least about 85 weight percent, at least about 90 weight percent, at least about 95 weight percent, or at least about 99 weight percent or can consist essentially of or consist of an inventive styrenic resin, while, in other embodiments, the tackifying agent can include one or more other resins in combination with an inventive styrenic resin. The styrenic resin can be an unhydrogenated resin, a partially hydrogenated resin, or a fully hydrogenated resin, depending on the specific application or adhesive composition.

When present, the one or more other resins can be selected from the group consisting of cycloaliphatic hydrocarbon resins, aromatically-modified cycloaliphatic resins, C5 hydrocarbon resins, C5/C9 hydrocarbon resins, aromatically-modified C5 hydrocarbon resins, C9 hydrocarbon resins, styrene/alpha-methyl styrene copolymer resins, styrene/vinyl toluene copolymer resins, styrene/para-methyl styrene copolymer resins, styrene/indene copolymer resins, styrene/methyl indene copolymer resins, styrene/C5 copolymer resins, styrene/C9 copolymer resins, terpene resins, terpene phenolic resins, terpene/styrene resins, rosins, esters of rosins, esters of modified rosins, modified rosins, liquid resins, fully or partially hydrogenated rosins, fully or partially hydrogenated rosin esters, fully or partially hydrogenated modified rosins/rosin esters, fully or partially hydrogenated rosin alcohols, fully or partially hydrogenated C5 resins, fully or partially hydrogenated C5/C9 resins, fully or partially hydrogenated aromatically-modified C5 resins, fully or partially hydrogenated C9 resins, fully or partially hydrogenated styrene/alpha-methyl styrene copolymer resins, fully or partially hydrogenated styrene/vinyl toluene copolymer resins, fully or partially hydrogenated styrene/para-methyl styrene copolymer resins, fully or partially hydrogenated styrene/indene copolymer resins, fully or partially hydrogenated styrene/methyl indene copolymer resins, fully or partially hydrogenated styrene/C5 copolymer resins, fully or partially hydrogenated styrene/C9 copolymer resins, fully or partially hydrogenated C5/cycloaliphatic resins, fully or partially hydrogenated C5/cycloaliphatic/styrene/C9 resins, fully or partially hydrogenated cycloaliphatic resins, fully or partially hydrogenated aromatically modified cycloaliphatic resins, and combinations thereof.

In addition to the adhesive base polymer or polymers and the tackifying agent, adhesive compositions formulated according to various embodiments of the present invention can comprise one or more additional modifiers, including, for example, oils, waxes, antioxidants, plasticizers, fillers, end block modifiers/polymer reinforcing agents, and combinations thereof. The types and amounts of the additional modifiers can vary, based on the specific type of adhesive composition being formulated. For example, in one embodiment wherein the adhesive composition comprises a hot melt packaging adhesive, the composition can comprise a wax in an amount of at least about 1 percent, at least about 5 percent, at least about 10 percent and/or not more than about 50 percent, not more than about 45 percent, or not more than about 40 percent, by weight of the total adhesive composition. Examples of suitable waxes can include, but are not limited to, microcrystalline waxes; metallocene-catalyzed waxes, including polyethylene (mPE) and polypropylene (mPP) waxes; paraffin (Fischer-Tropsch) waxes; vegetable waxes; highly-branched, maleated, low molecular weight waxes derived from petroleum; solid oils; and combinations thereof.

In another embodiment wherein the adhesive composition comprises a hot melt pressure sensitive adhesive or a hot melt nonwoven adhesive, the composition can include one or more oils in an amount of at least about 1 percent, at least about 2 percent, at least about 5 percent and/or not more than about 30 percent, not more than about 25 percent, or not more than about 20 percent, by weight of the total adhesive composition. Examples of suitable oils can include, but are not limited to, naphthenic mineral oil, paraffinic mineral oil, hydrotreated mineral oils, aromatic oils, triglyceride oils, and combinations thereof. In addition, the adhesive composition can include one or more extender oils, such as, for example, liquid paraffin, castor oil, rape seed oil, mineral oil, and combinations thereof.

In addition to waxes and/or oils, the adhesive composition can comprise one or more antioxidants, plasticizers (e.g., dibutyl phthalate, dioxtyl phthalate, non-phthalate plasticizers, and/or chlorinated paraffins), fillers (e.g., carbon black, titanium oxide, and/or zinc oxide), end block modifiers/polymer reinforcing agents, and combinations thereof, as well as any other additive that would render the final formulation suitable for a particular application. In some embodiments, one or more styrenic resins as described above can be added to a polymeric system including at least one polymer material to thereby improve the stability, processability, and/or mechanical and thermal properties of the resulting polymer system. In some embodiments wherein the styrenic resin as described above is used as a polymer modification agent, the resin can be utilized an amount of at least about 1 percent, at least about 5 percent, or at least about 7 percent and/or not more than about 60 percent, not more than about 55 percent, or not more than about 50 percent, by weight, of the a mixture of one or more polymers. The polymers, which can be present in an amount of at least about 30 percent, at least about 35 percent, at least about 40 percent and/or not more than about 99 percent, not more than about 95 percent, or not more than about 90 percent, based on the total weight of the composition, can be selected from the group of adhesive base polymers above. The styrenic resin utilized to enhance the processability of one or more polymeric systems can be unhydrogenated or at least partially hydrogenated, as described in detail above.

Adhesive compositions according to various embodiments of the present invention can be prepared using any suitable method. For example, the components of the adhesive composition can be combined in a Sigma blade mixer, a Plasticorder, a Brabender mixer, a twin screw extruder, or via an in-can blend (pint-cans). The resulting adhesive mixture can then be shaped into a desired form by an appropriate technique including, for example, extrusion, compression molding, calendaring or roll coating techniques (e.g., gravure, reverse rolling, etc.). The adhesive can also be applied to an appropriate substrate via curtain coating or slot-die coating or sprayed through a suitable nozzle configuration at an appropriate speed with conventional nonwoven application equipment.

In one embodiment, the adhesive composition as described herein may be applied to a substrate by melting the blended composition and applying a suitable amount (e.g., from 0.1 to 100 g/m$^2$) of adhesive blend to a desired substrate (e.g., textile fabric, paper, glass, plastic, nonwovens, and/or metal) to thereby form an adhesive article. Examples of adhesive articles constructed from adhesive compositions according to the present invention can include, but are not limited to, tapes such as packaging tape, duct tape, masking tape, invisible tape, electrical tape, gaffer tape, hockey tape, and other specialty tapes; labels such as paper labels, beverage labels, smart labels, consumer electronic labels, pharmaceutical labels, labels for graphic arts, and the like; packaging applications including case sealings, book binders, corrugated box adhesives, folding carton adhesives, glue sticks, and the like; and nonwoven applications including diaper construction adhesives, diaper elastic attachment adhesives, stretch films, feminine napkin adhesives, adult incontinence product adhesives, disposable bed or pet pad adhesives, small nonwoven laminates, and the like.

In addition to adhesive compositions, the styrenic resins described herein, including unhydrogenated and at least partially hydrogenated polystyrene resins, may be useful in other applications. For example, in one embodiment, the polystyrene resins described herein may be used in rubber compositions utilized in one or more components of a tire, such as, for example, tire treads or sidewalls. In some embodiments, one or more styrenic resins, as described herein, can be used as a replacement for various types of oil typically utilized in the tire rubber compositions, to improve the processability of the rubber composition and/or to improve the ultimate performance and/or mechanical properties of the tire, such as, for example, modulus of elasticity, rolling resistance, wet grip, tensile strength, and the like. Furthermore, other applications or uses of the inventive styrenic resins disclosed herein are contemplated as falling within the scope of the present invention.

EXAMPLES

The following Examples are intended to highlight various aspects of certain embodiments of the present invention. It should be understood, however, that these Examples are included merely for purposes of illustration and are not intended to limit the scope of the invention, unless otherwise specifically indicated.

Example 1

Preparation of Polystyrene Resins

Resin A was prepared as follows. After being separately passed through fixed beds of alumina to remove polymerization inhibitors and moisture, 250 grams each of styrene and Aromatic A-100 solvent (commercially available from Exxon Mobil Chemical Company, Houston, Tex.) were introduced into a 500-mL glass reaction vessel. The vessel was submerged in an external cooling bath of dry ice and isopropyl alcohol to control the temperature during polymerization. Under mechanical agitation, the solution was then cooled to 0° C. and 600 ppm of boron trifluoride, $BF_3$, was gradually fed into the monomer/solvent blend over a period of 40 minutes. After 40 minutes, the resulting reaction mixture was allowed to soak in the reactor for an additional 30 minutes at 0° C., after which lime was added to stop the reaction and neutralize any remaining $BF_3$ gas. The resulting polymer solution was then steam stripped to remove residual solvent and recover the polystyrene resin.

Resin B was prepared according to the same procedure described above with respect to Resin A, with the following exceptions. The 250-gram sample of styrene was blended with 250 grams of Recycled Hydrogenation Solvent (RHS, commercially available from Eastman Chemical Company), rather than A-100 solvent. In addition, the polymerization and soaking temperatures were each raised to 30° C.

Resin C was prepared according to the same procedure described above with respect to Resin B, except the polymerization and soaking temperatures were each raised to 70° C.

Resin D was prepared by combining 10 grams of FILTROL F-22 acid clay catalyst (commercially available from BASF, Florham Park, N.J.) with 210 grams of A-100 solvent in the reaction vessel. Under agitation, the mixture was heated to 65° C. and 290 grams of styrene was incrementally added to the reaction vessel over a period of 60 minutes. After all of the styrene had been added to the reactor, the reaction mixture was allowed to soak for an additional 60 minutes at a temperature of 65° C. The spent acid clay catalyst was filtered from the polymer solution and the resulting polystyrene resin was recovered as discussed above with respect to Resin A.

Resin E was prepared according to the same procedure described above with respect to Resin D, except RHS was utilized as the reaction solvent.

The polymerization conditions described above for each of Resins A-E are summarized in Table 4, below.

TABLE 4

Key Polymerization Conditions for Polystyrene Resins A-E

| Sample | Solvent Type | Catalyst Type | Reaction Sequence | Polymerization Temperature (° C.) |
|---|---|---|---|---|
| Resin A | A-100 | $BF_3$ | straight | 0 |
| Resin B | RHS | $BF_3$ | straight | 30 |
| Resin C | RHS | $BF_3$ | straight | 70 |
| Resin D | A-100 | F-22 acid clay | reverse | 65 |
| Resin E | RHS | F-22 acid clay | reverse | 65 |

Once recovered, each of Resins A-E were analyzed to determine the following properties: (1) Ring & Ball softening point; (2) mixed aniline cloud point (MMAP); (3) molecular weight; and (4) molecular weight distribution (polydispersity). The Ring & Ball softening point was measured according to ASTM E-28 "Standard Test Method for Softening Point by Ring and Ball Apparatus" (1996) and MMAP was determined according to ASTM D-611 "Standard Test Methods for Aniline Point and Mixed Aniline Point of Petroleum Products and Hydrocarbon Solvents" (2007). The number, weight, and z-average molecular weights (Mn, Mw, and Mz) reported above were determined via gel permeation chromatography (GPC) with THF as a solvent according to the following procedure: Each resin was analyzed at ambient temperature in Burdick and Jackson GPC-grade THF stabilized with BHT, at a flow rate of 1 ml/min. Sample solutions were prepared by dissolving about 50 mg of each resin in 10 ml of THF and adding 10 microliters of toluene thereto as a flow-rate marker. An autosampler was used to inject 50 microliters of each solution onto a Polymer Laboratories PLgel™ column set consisting of a 5 micrometer Guard, a Mixed-C™ and an Oligopore™ column in series. The eluting polymer was detected by differential refractometry, with the detector cell held at 30° C. The detector signal was recorded by a Polymer Laboratories Caliber™ data acquisition system, and the chromatograms were integrated with software developed at Eastman Chemical Company. A calibration curve was determined with a set of eighteen nearly monodisperse polystyrene standards with molecular weight from 266 to 3,200,000 g/mole and 1-phenylhexane at 162 g/mole. The molecular weight distributions and averages were reported either as equivalent polystyrene values or as true molecular weights calculated by means of a universal calibration procedure with the following parameters:

$K_{PS}=0.0128$ $a_{PS}=0.712$ $K_{CE}=0.00757$ $a_{CE}=0.842$

The results of the above-listed analyses for each of Resins A-E are summarized in Table 5, below.

TABLE 5

Summary of Results for Analyses of Resins A-E

| Sample | Softening Point (° C.) | MMAP (° C.) | GPC Molecular Weights | | | |
|---|---|---|---|---|---|---|
| | | | Mn | Mw | Mz | Mw/Mn |
| Resin A | 90.1 | 6 | 882 | 1990 | 3726 | 2.26 |
| Resin B | 130.3 | 15 | 3007 | 12,663 | 27,849 | 4.21 |
| Resin C | 122.7 | 13 | 2385 | 7997 | 15,325 | 3.35 |
| Resin D | 48.6 | −1 | 425 | 641 | 988 | 1.51 |
| Resin E | 90.3 | 4 | 880 | 1722 | 2893 | 1.96 |

As shown in Table 5, Resin E was the only polystyrene resin to exhibit a relatively high softening point (e.g., above 70° C.), while still maintaining a relatively low z-average molecular weight (e.g., not more than 3,000 dalton) and a relatively narrow polydispersity (e.g., not more than 2.0).

phatic hydrogen content. The softening point, MMAP, molecular weights, and molecular weight distribution were determined as described above in Example 1. The DACP cloud point was determined according to ASTM D-5773 "Standard Test Method for Cloud Point of Petroleum Products (Constant Cooling Rate Method)" (2010), and the aromatic/aliphatic content was determined using nuclear magnetic resonance (NMR), as described in detail below.

To the aromatic hydrogen content of each hydrogenated polystyrene resin, the ratio of the integration area of aromatic hydrogen relative to the total integration area of hydrogen on the resin's NMR spectrum was determined via NMR analysis. The NMR analysis was performed using a JEOL 600 MHz Eclipse NMR system with a pulse interval of 15 seconds, acquisition time of 3.6 seconds, pulse angle of 90°, X resolution of 0.27 Hz, and number of scans set at 16. The resin NMR samples were prepared by dissolving a known amount of each of Hydrogenated Resins F and G in methylene chloride-d2. The total integration value was normalized to 100. The results were reported in area percent.

The results of the above-listed analyses for each of Hydrogenated Resins F and G are summarized in Table 6, below.

TABLE 6

Summary of Analysis of Hydrogenated Polystyrene Resins F and G

| Sample | Softening Point (° C.) | DACP (° C.) | MMAP (° C.) | GPC Molecular Weights | | | | NMR (%) | |
|---|---|---|---|---|---|---|---|---|---|
| | | | | Mn | Mw | Mz | Mw/Mn | Aliphatic Hydrogen | Aromatic Hydrogen |
| Hydrogenated Resin F | 91 | 37 | 68 | 764 | 1297 | 2145 | 1.69 | 91.2 | 8.6 |
| Hydrogenated Resin G | 96 | 55 | 88 | 742 | 1250 | 2061 | 1.69 | 96.5 | 3.4 |

Example 2

Preparation of Hydrogenated Styrene Resins

Two samples a polystyrene resin prepared as described in Example 1, above, with respect to Resin E, were hydrogenated under different conditions in a 1-L hydrogenation autoclave. During the first trial, a sample of the polystyrene resin was combined with 1.25 grams of Ni-5256P nickel hydrogenation catalyst (commercially available from BASF in Florham Park, N.J.) in RHS and 500 grams of solution were heated in the autoclave to a hydrogenation temperature of 245° C., under nitrogen. Once the desired temperature was achieved, hydrogen was fed into the reactor was increased to 900 psig and held constant as the reaction mixture was mechanically agitated for 25 minutes. At the end of hydrogenation, the pressure was released and the polymer solution was allowed to cool to 100° C. before being removed from the autoclave. The spent catalyst was filtered from the polymer solution and the resulting hydrogenated resin (Hydrogenated Resin F) was steam stripped to remove residual solvent.

The second trial was conducted in an analogous manner to the first run, except the autoclave contents were heated to the 245° C. hydrogenation temperature under 900 psig of hydrogen. The resulting hydrogenated resin (Hydrogenated Resin G) was recovered in a similar manner as described previously.

Once recovered, the following properties were determined for each of Hydrogenated Resins F and G: (1) Ring & Ball softening point; (2) mixed aniline cloud point (MMAP); (3) DACP cloud point; (4) molecular weight; (5) molecular weight distribution (polydispersity); and (6) aromatic/ali- Subsequent analysis demonstrated the particular compatibility of Hydrogenated Resin F in a hot melt nonwoven adhesive composition comprising a blend of SBS copolymers, while Hydrogenated Resin G exhibited good compatibility with a blend of metallocene polyolefin base polymers in a hot melt packaging adhesive composition. Additional data regarding adhesive compositions employing polystyrene resins according to embodiments of the present invention will be provided shortly in subsequent Examples.

Example 3

Analysis of Various Tackifying Resins for Use in Hot Melt Adhesive Compositions

Common properties of several different types of tackifying resins suitable for use in hot melt adhesive compositions were tested and compared. A list of the tackifiers analyzed is provided in Table 7, below. As shown in Table 7, the comparative tackifying resins analyzed included hydrogenated C9 resins (Tackifiers A and B), hydrogenated petroleum resins (Tackifiers E, F, G, and H), and hydrogenated polystyrene resins prepared in a manner similar to that described with respect to Resin A in Example 1 (Tackifiers C and D).

The inventive tackifying resins analyzed included both partially (Tackifiers 1 and 2) and fully (Tackifiers 3 and 4) hydrogenated polystyrene resins produced via the method described with respect to Resin E in Example 1. In particular, Inventive Tackifiers 1-4 were prepared via reverse addition of styrene to an acid-clay catalyst in the presence of RHS solvent at polymerization temperatures of 60° C. (Tackifiers 1 and 3) and 55° C. (Tackifiers 2 and 4). The Ring & Ball softening point of the base (non-hydrogenated) polystyrene resins ranged from 80° C. (Tackifiers 1 and 3) to 85° C. (Tackifiers 2 and 4).

tor with Gardner varnish color Scales No. C620C-44 Range 1-9 and 9-18 according to ASTM D-6166 "Standard Test Method for Color of Naval Stores and Related Products (Instrumental Determination of Gardner Color)" (2008). The results of the above-listed analyses for each of comparative Tackifiers A-H and inventive Tackifiers 1-4 are summarized in Table 8, below.

TABLE 8

Results of Property Analyses for Tackifying Resins

| Tackifier | R&B Softening Point (° C.) | MMAP (° C.) | DACP (° C.) | Gardner Color | Aromatic/ Aliphatic/ Olefinic (%) | GPC Molecular Weight | | | |
|---|---|---|---|---|---|---|---|---|---|
| | | | | | | Mz | Mn | Mw | Mw/Mn |
| A | 100 | 57 | 18 | <1 (neat) | — | 1400 | 600 | 900 | 1.50 |
| B | 102 | 62 | 20 | <1 (neat) | — | 1500 | 600 | 900 | 1.50 |
| C | 100.1 | 53 | 15 | <1 (neat) | 82.4/17.4/0.2 | 3959 | 958 | 2127 | 2.22 |
| D | 120 | 85 | 67 | <1 (neat) | 95.2/4.6/0.2 | 3917 | 891 | 1820 | 2.04 |
| E | 100 | 81 | 69 | <1 (neat) | — | 2150 | 450 | 1000 | 2.22 |
| F | 100 | 49 | 31 | <2 (50% toluene) | 90.6/9.0/0.4 | 950 | 270 | 520 | 1.93 |
| G | 130 | 83 | 76 | <1 (neat) | 99.8/0.2/0.0 | 2246 | 464 | 879 | 1.89 |
| H | 127 | 56 | 52 | <1 (neat) | 94.4/5.4/0.2 | 1634 | 431 | 666 | 1.55 |
| 1 | 91 | 68 | 37 | <1 (neat) | 91.2/8.6/0.2 | 1692 | 651 | 997 | 1.53 |
| 2 | 96 | 72 | — | <1 (neat) | 90.9/8.9/0.2 | 2112 | 807 | 1325 | 1.64 |
| 3 | 96.3 | 88 | 55 | <1 (neat) | 96.5/3.4/0.1 | 1609 | 621 | 943 | 1.52 |
| 4 | 109 | 101 | 69.5 | <1 (neat) | 99.7/0.3/0.0 | 1646 | 681 | 1024 | 1.50 |

TABLE 7

Summary of Tackifying Resins Analyzed

| Tackifier | Type | Description |
|---|---|---|
| A | Comparative | Hydrogenated C9 Resin[1] |
| B | Comparative | Hydrogenated C9 Resin[2] |
| C | Comparative | Hydrogenated Polystyrene Resin |
| D | Comparative | Hydrogenated Polystyrene Resin |
| E | Comparative | Hydrogenated Petroleum Resin[3] |
| F | Comparative | Hydrogenated Petroleum Resin[4] |
| G | Comparative | Hydrogenated Petroleum Resin[5] |
| H | Comparative | Hydrogenated Petroleum Resin[6] |
| 1 | Inventive | Hydrogenated Polystyrene Resin |
| 2 | Inventive | Hydrogenated Polystyrene Resin |
| 3 | Inventive | Hydrogenated Polystyrene Resin |
| 4 | Inventive | Hydrogenated Polystyrene Resin |

Notes:
[1]Commercially available from Eastman Chemical Company as REGALITE S5100.
[2]Commercially available from Eastman Chemical Company as REGALITE R7100.
[3]Commercially available from Eastman Chemical Company as EASTOTAC H100W.
[4]Commercially available from Exxon Mobil Chemical Company as ESCOREZ 5600.
[5]Commercially available from Eastman Chemical Company as EASTOTAC H130W.
[6]Commercially available from Exxon Mobil Chemical Company as ESCOREZ 5637.

The Ring & Ball softening point, MMAP, DACP, molecular weights, polydispersity, NMR aliphatic/aromatic/olefinic content, and Gardner color were measured for each of the tackifying resins listed in Table 7. All properties were measured as previously discussed in Examples 1 and 2, above, and Gardner Color was measured using a Hellige color compara- Several types of hot melt adhesive compositions that utilize the resins analyzed above as tackifying agents are formulated and compared in Examples 4-11, below.

Example 4

Preparation of Hot Melt Adhesive Compositions

Hot melt adhesive compositions, including hot melt nonwoven adhesives and hot melt packaging adhesives, that employed one or more tackifiers listed in Table 7 were prepared as described below.

Several hot melt nonwoven adhesive compositions were prepared as follows. An antioxidant was added to an adhesive base polymer, and the resulting mixture was initially masticated in a Plasticorder Brabender mixer using roller blades and sigma blades at a temperature between 125° C. and 177° C. After several minutes, a tackifying agent and an oil were added, and the combined mixture was blended for 20 to 45 minutes, until the mixer torque plateaued. Tables 10a and 10b, below, summarize the specific formulations of each of Comparative Nonwoven Adhesives A-C, I, and J and Inventive Nonwoven Adhesives 1 and 5, prepared as described herein.

Several hot melt packaging adhesives were prepared as follows. An adhesive base polymer and an antioxidant were combined in a pint-sized can. The resulting mixture was agitated with a paddle-type agitator controlled with a variable speed motor and heated with a heating block to 177° C. under a nitrogen blanket. After the polymer melted, a wax and a tackifier were introduced into the can and the resulting mixture was agitated for an additional 30 minutes until a homogenous mixture was obtained. The resulting composition was poured onto a piece of silicone-lined cardboard and allowed to cool. Tables 10a and 10b, below, summarize the specific compositions of each of Comparative Packaging Adhesives D-H and K, and Inventive Nonwoven Adhesives 2-4, 6, and 7, prepared as described herein.

TABLE 9a

Formulations for Comparative Hot Melt Adhesive Compositions A-K

| Comparative Adhesive | Base Polymer(s) Type | Wt % | Tackifying Resin/Agent Type | Wt % | Oil or Wax Type | Wt % | Antioxidant Type[5] | Wt % |
|---|---|---|---|---|---|---|---|---|
| Nonwoven Adhesive A | KRATON D1102[1] | 19.7 | Tackifier A | 59.7 | CALSOL 5550[4] | 19.6 | IRGANOX 1010 | 1.0 |
| Nonwoven Adhesive B | KRATON D1102[1] | 19.7 | Tackifier B | 59.7 | CALSOL 5550[4] | 19.6 | IRGANOX 1010 | 1.0 |
| Nonwoven Adhesive C | KRATON D1102[1] | 19.7 | Tackifier C | 59.7 | CALSOL 5550[4] | 19.6 | IRGANOX 1010 | 1.0 |
| Packaging Adhesive D | AFFINITY G1950[2] | 40.0 | Tackifier G | 40.0 | SASOL H-1[3] | 20 | IRGANOX 1010 | 0.6 |
| Packaging Adhesive E | AFFINITY G1950[2] | 40.0 | Tackifier H | 40.0 | SASOL H-1[3] | 20 | IRGANOX 1010 | 0.6 |
| Packaging Adhesive F | AFFINITY G1950[2] | 40.0 | Tackifier E | 40.0 | SASOL H-1[3] | 20 | IRGANOX 1010 | 0.6 |
| Packaging Adhesive G | AFFINITY G1950[2] | 40.0 | Tackifier F | 40.0 | SASOL H-1[3] | 20 | IRGANOX 1010 | 0.6 |
| Packaging Adhesive H | AFFINITY G1950[2] | 40.0 | Tackifier G | 40.0 | SASOL H-1[3] | 20 | IRGANOX 1010 | 0.6 |
| Nonwoven Adhesive I | KRATON D1155BO[1] | 19.7 | Tackifier A | 59.7 | CALSOL 5550[4] | 19.6 | IRGANOX 1010 | 1.0 |
| Nonwoven Adhesive J | KRATON D1155BO[1] | 19.7 | Tackifier B | 59.7 | CALSOL 5550[4] | 19.6 | IRGANOX 1010 | 1.0 |
| Packaging Adhesive K | AFFINITY GA1900[2] | 40.0 | Tackifier C | 40.0 | SASOL H-1[3] | 20 | IRGANOX 1010 | 0.6 |

Notes:
[1] Commercially available from Kraton Polymer, Houston, TX.
[2] Commercially available from Dow Chemical Company, Midland, MI.
[3] Commercially available from Sasol Ltd., Johannesburg, South Africa.
[4] Commercially available from Calumet Lubricants, Indianapolis, IN.
[5] Commercially available from BASF, Florham Park, NJ.

TABLE 9b

Formulations for Inventive Hot Melt Adhesive Compositions 1-7

| Inventive Adhesive | Base Polymer(s) Type | Wt % | Tackifying Resin/Agent Type | Wt % | Oil or Wax Type | Wt % | Antioxidant Type[5] | Wt % |
|---|---|---|---|---|---|---|---|---|
| Nonwoven Adhesive 1 | KRATON D1102[1] | 19.7 | Tackifier 1 | 59.7 | CALSOL 5550[4] | 19.6 | Irganox 1010[3] | 1.0 |
| Packaging Adhesive 2 | AFFINITY G1950[2] | 40.0 | Tackifier 1 | 40.0 | SASOL H-1[3] | 20 | Irganox 1010[3] | 0.6 |
| Packaging Adhesive 3 | AFFINITY G1950[2] | 40.0 | Tackifier 4 | 40.0 | SASOL H-1[3] | 20 | Irganox 1010[3] | 0.6 |
| Packaging Adhesive 4 | AFFINITY G1950[2] | 40.0 | Tackifier 3 | 40.0 | SASOL H-1[3] | 20 | Irganox 1010[3] | 0.6 |
| Nonwoven Adhesive 5 | KRATON D1155BO[1] | 19.7 | Tackifier 1 | 59.7 | CALSOL 5550[4] | 19.6 | Irganox 1010[3] | 1.0 |
| Packaging Adhesive 6 | EVATANE 28-420[6] | 33.3 | Tackifier 2 | 33.3 | Paraffin Wax SASOL H-1[3] | 20 13.3 | Irganox 1010[3] | 0.2 |
| Packaging Adhesive 7 | EASTOFLEX P1023[7] EASTOFLEX P1060[7] | 39.9 39.9 | Tackifier 2 | 20.0 | — | — | Irganox 1010[3] | 0.2 |

Notes:
[1] Commercially available from Kraton Polymer, Houston, TX.
[2] Commercially available from Dow Chemical Company, Midland, MI.
[3] Commercially available from Sasol Ltd., Johannesburg, South Africa.
[4] Commercially available from Calumet Lubricants, Indianapolis, IN.
[5] Commercially available from BASF, Florham Park, NJ.
[6] Commercially available from Arkema Chemical, King of Prussia, PA.
[7] Commercially available from Eastman Chemical Company, Kingsport, TN.

Example 5

Evaluation of Hot Melt Adhesive Compositions Using Dynamic Mechanical Analysis Several adhesive compositions prepared in Example 4, above, were evaluated using Dynamic Mechanical Analysis (DMA). The DMA was performed using a TA Instruments Ares RDA3 Rheometer in a parallel plate geometry and autostrain mode (maximum strain at 5%). The frequency was 10 Hz and the heating rate was 6° C./min. Rheological curves, illustrating values for G' and Tan δ (G''/G') for both the comparative and inventive nonwoven and packaging adhesives, are provided in FIGS. 2 and 3, respectively.

Figure 2:
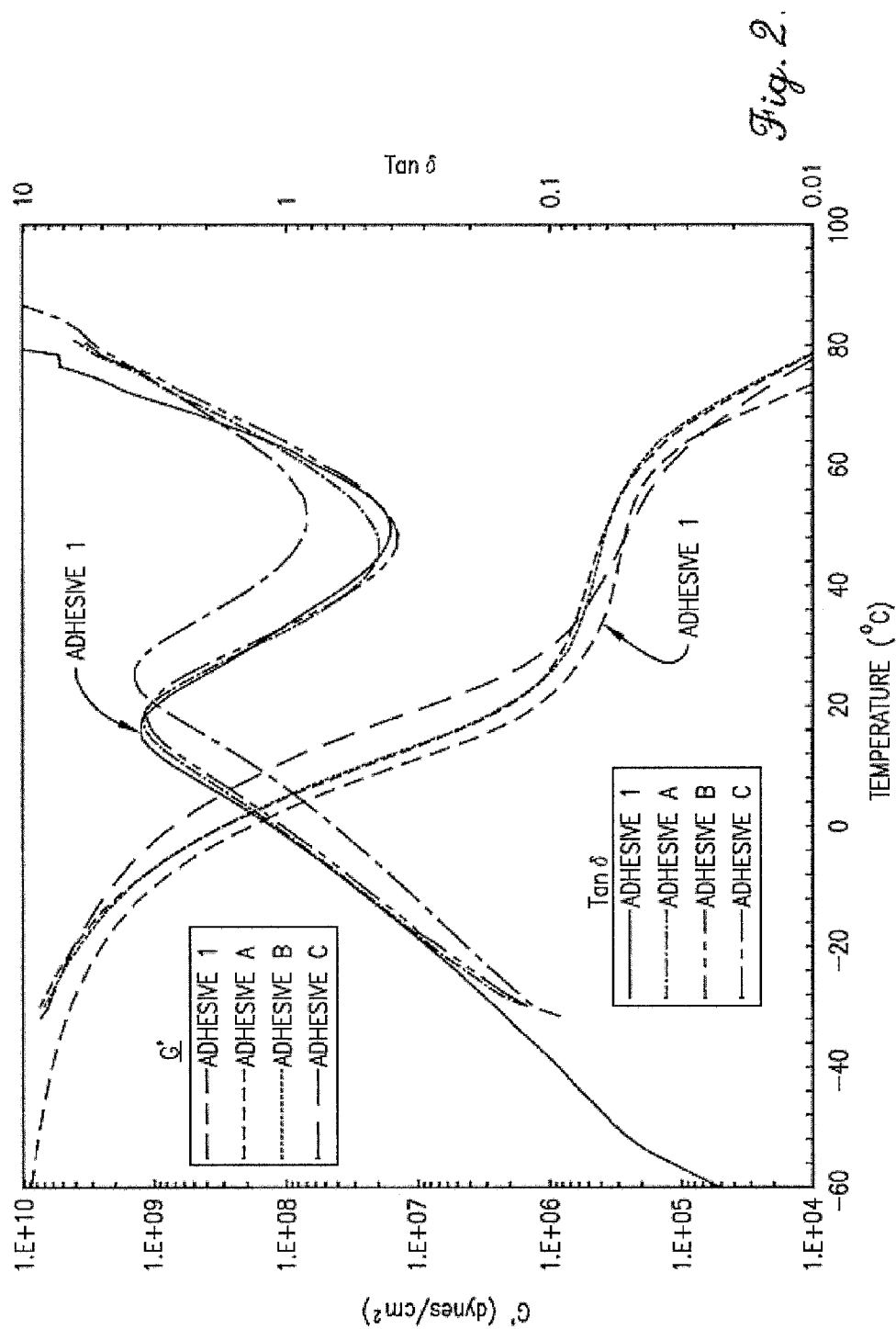
FIG. 2 is a graphical summary of the results of a dynamic mechanical analysis of several comparative and inventive nonwoven adhesives, particularly illustrating the low application temperature and desirable adhesive properties of nonwoven adhesives formulated according to embodiments of the present invention.

As shown in FIG. 2, it can be concluded that, while exhibiting a lower softening temperature than Comparative Adhesives A-C, as evidenced by the G' curves at 25° C., Inventive Adhesive 1 maintains comparable, or even superior adhesive tack, as evidenced by comparison of the respective Tan δ curves. Thus, it can be concluded that utilizing an inventive hydrogenated polystyrene resin as a tackifying agent results in an optimized adhesive blend having both a low application temperature and sufficient adhesive strength.

Figure 3:
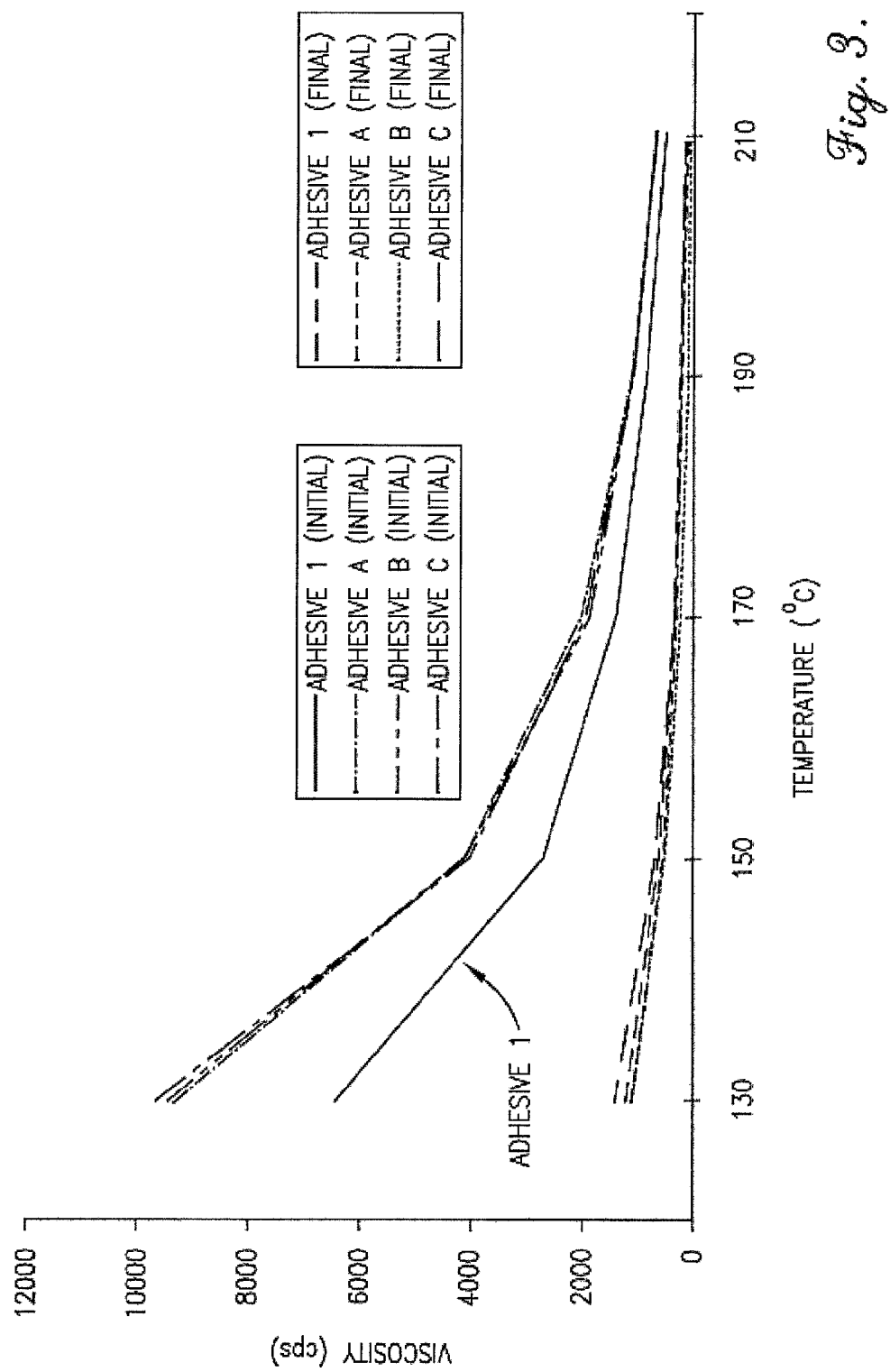
FIG. 3 is a graphical summary of the results of a dynamic mechanical analysis of several comparative and inventive packaging adhesives, particularly illustrating the low application temperature and desirable adhesive properties of packaging adhesives formulated according to embodiments of the present invention.

Similarly, as shown in FIG. 3, Inventive Adhesives 2-4 also exhibit lower softening temperatures, as evidenced by comparison of the G' curves at 25° C., while maintaining comparable, or even superior, adhesive tack, as evidenced by comparison of the respective Tan δ curves. Further, as evidenced by the single Tg (e.g., maximum peak of the G' curve) for each of Inventive Adhesives 2-4, the components of these inventive blends are suitably compatible with each other.

Typically, the difference between the softening point (e.g., the minimum point on the G' curve) and the Tg for each adhesive can be correlated to the 'open time' of the adhesive during its application to a substrate. As shown in FIG. 3, the open times of the Inventive Adhesives 2-4 are substantially larger than those of Comparative Adhesives D-H, indicating the inventive resins have a longer 'window' of application. This, coupled with the low softening point relative to the softening points of Comparative Adhesives D-H, indicate the higher formulation latitude (flexibility) of the Inventive Adhesives 2-4, which, as evidenced by the Tan δ curves, still perform as well, if not better than, similarly produced Comparative Adhesives D-H.

Example 6

Evaluation of Thermal Stability of Hot Melt Adhesive Compositions

Figure 4:
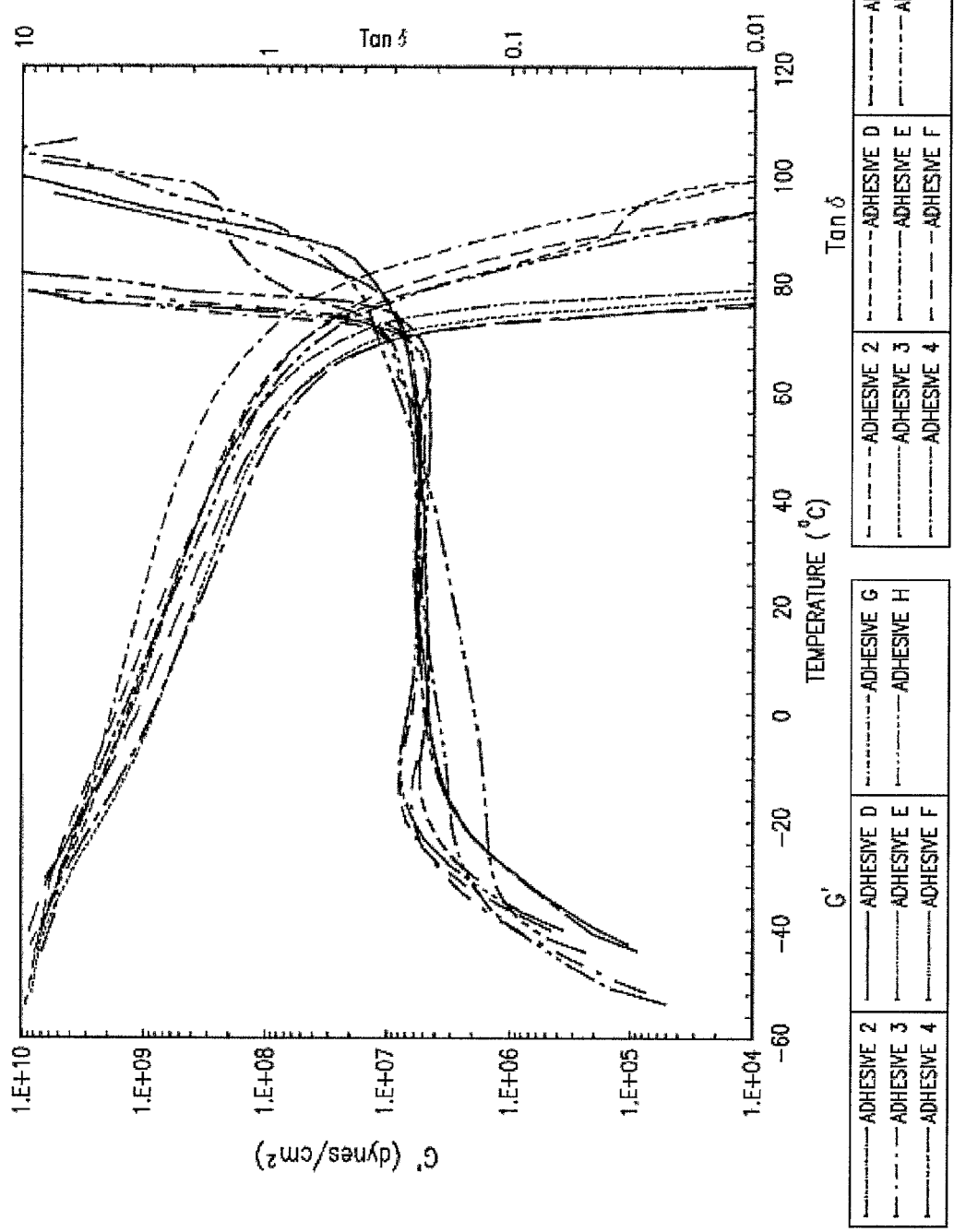
FIG. 4 is a graphical summary of initial (formulation) and final (aged) rheological curves for several comparative and inventive nonwoven adhesives, particularly illustrating the greater thermal stability of nonwoven adhesives formulated according to embodiments of the present invention.
Figure 5:
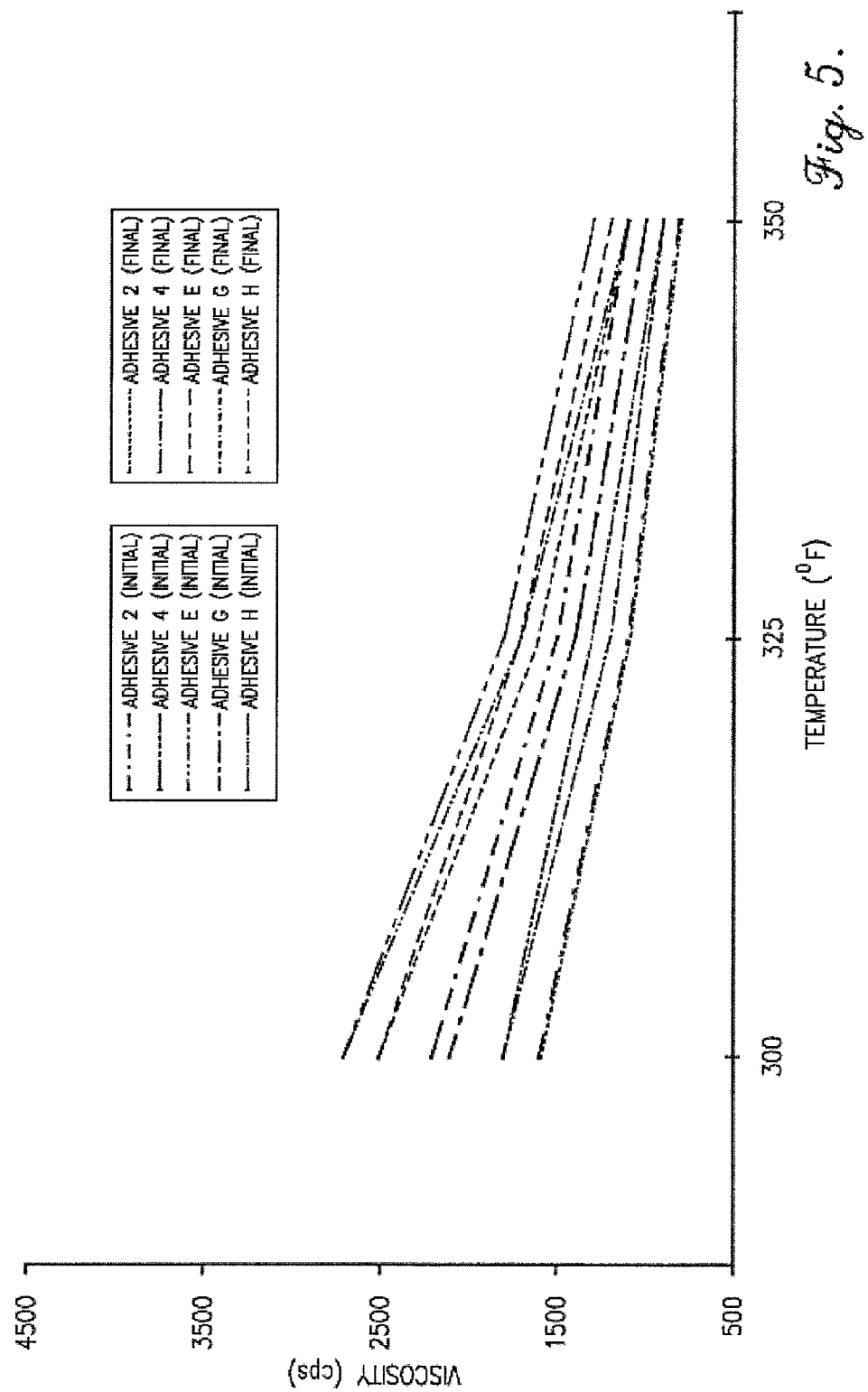
FIG. 5 is a graphical summary of initial (formulation) and final (aged) rheological curves for several comparative and inventive packaging adhesives, particularly illustrating the greater thermal stability of the packaging adhesives formulated according to embodiments of the present invention.

The thermal stability of each of Comparative Adhesives A-H and Inventive Adhesives 1-4 was analyzed by comparing viscosity curves generated before and after each composition was thermally aged. The initial viscosity curves were generated for each newly formulated sample of Comparative Nonwoven Adhesives A-C and Inventive Nonwoven Adhesive 1 using a Brookfield viscometer (DV II, spindle #27) over a range of temperatures between 130° C. and 210° C. Each sample was then aged in a forced air-draft oven at a temperature of 177° C. for 72 hours. A final viscosity curve for each of these adhesives was then generated in an analogous manner. For Comparative Packaging Adhesives D-H and Inventive Packaging Adhesives 2-4, the initial viscosity curves were generated in a similar manner, but at temperatures of 300° F., 325° F., and 350° F. Each sample was then aged in a forced air-draft oven at a temperature of 177° C. for 96 hours before generating the final viscosity curves in an analogous manner. FIG. 4 illustrates the initial and final viscosity curves for Comparative Nonwoven Adhesive Adhesives A-C and Inventive Nonwoven Adhesive 1, while FIG. 5 presents the initial and final curves for Comparative Packaging Adhesives D-H and Inventive Packaging Adhesives 2-4.

As shown in FIG. 4, over the temperature range measured, the initial viscosity of Inventive Nonwoven Adhesive 1 changes not more than the viscosities of any of Comparative Nonwoven Adhesives A-C, indicating that Inventive Adhesive 1 has greater thermal stability. Further, it can be concluded that the adhesive application temperature of Inventive Nonwoven Adhesive 1 is lower than that of Comparative Nonwoven Adhesives A-C, as indicated by the lower viscosity of Inventive Adhesive 1 at a given temperature. Similarly, as shown in FIG. 5, the initial viscosities of Inventive Packaging Adhesives 2-4 change less over the measured temperature range than the viscosities of any of Comparative Packaging Adhesives D-H, indicating that Inventive Packaging Adhesives 2-4 generally have a greater thermal stability. Further, as indicated by lower viscosities at a given temperature, the adhesive application temperatures of Inventive Packaging Adhesives 2-4 is expected to be lower than that of Comparative Adhesives D-H, which may be advantageous during application of these adhesives to a substrate.

Example 7

Adhesion Strength of Hot Melt Packaging Adhesives D-H and 2-4

Figure 6:
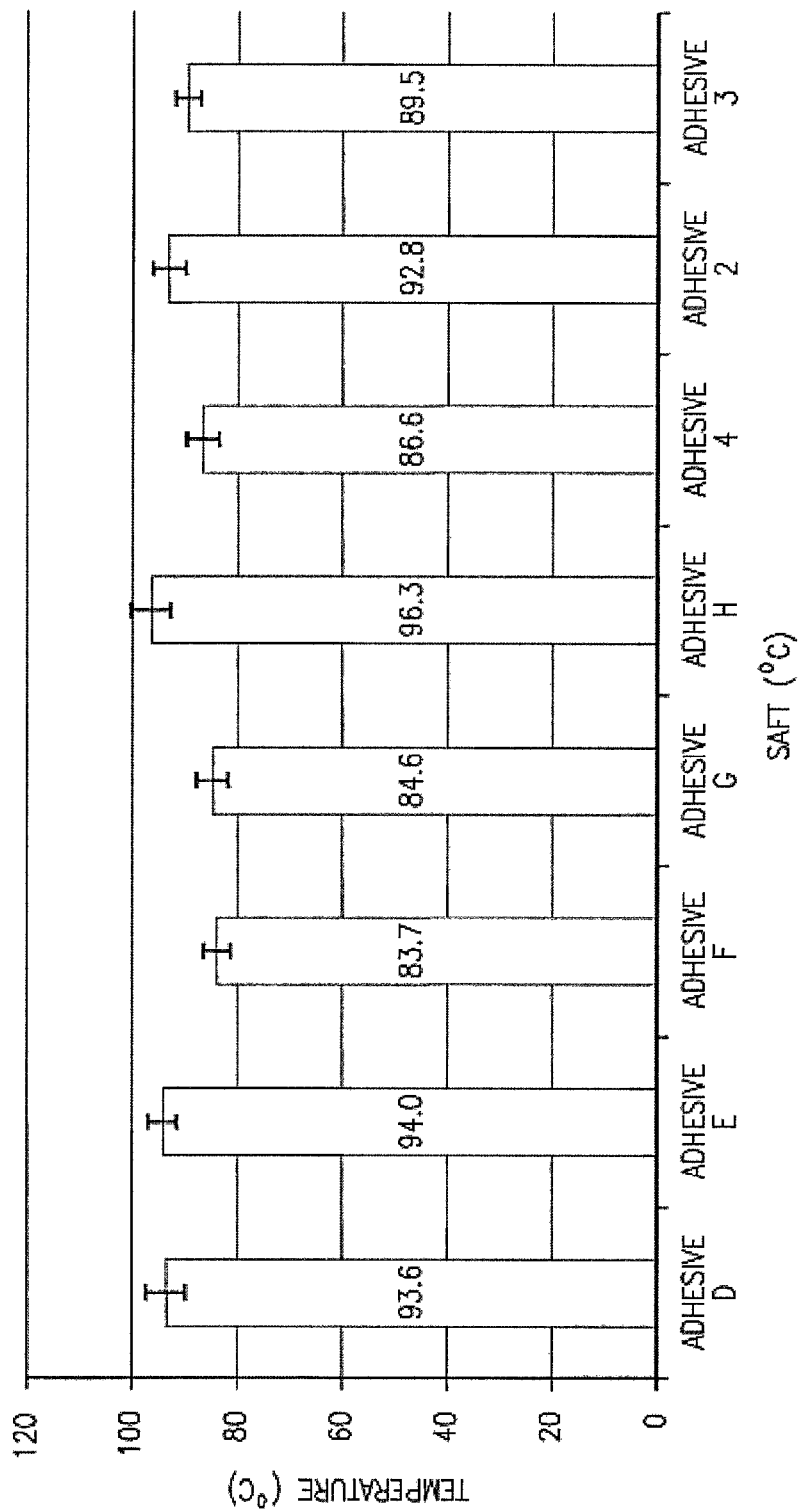
FIG. 6 summarizes the results of SAFT performed on several comparative and inventive packaging adhesive compositions, particularly illustrating the at least comparable performance of packaging adhesives formulated according to embodiments of the present invention.

The adhesive strength of Comparative Packaging Adhesives D-H and Inventive Packaging Adhesives 2-4 were tested over a broad temperature range. To evaluate adhesive strength, each adhesive was subjected to a shear adhesion failure test (SAFT), as defined in ASTM D-4498 "Standard Test Method for Heat-Fail Temperature in Shear of Hot Melt Adhesives" (2007). In addition, the percent fiber tear for each adhesive was determined by first applying a sample of each adhesive to a piece of corrugated cardboard substrate (having a width of 2 inches and a length of 2.5 inches and cut such that the ribs ran lengthwise along the sample) and subsequently measuring percent fiber tear. The SAFT results and percent fiber tear results for each of Comparative Packaging Adhesives D-H and Inventive Packaging Adhesives 2-4 are provided in FIG. 6 and Table 10, respectively.

TABLE 10

Percent Fiber Tear for Packaging Adhesive Compositions D-H and 2-4

| Packaging Adhesive | Fiber Tear (%) | | | | |
|---|---|---|---|---|---|
| | 57° C. | 23° C. | 4° C. | −7° C. | −18° C. |
| Comparative Packaging Adhesive D | 100 | 100 | 100 | 50 | <50 |
| Comparative Packaging Adhesive E | 100 | 100 | 100 | 50 | 50 |
| Comparative Packaging Adhesive F | 100 | 100 | 100 | 100 | 100 |
| Comparative Packaging Adhesive G | 100 | 100 | 100 | 100 | 100 |
| Comparative Packaging Adhesive H | <20 | 40 | <20 | <20 | 20 |
| Inventive Packaging Adhesive 2 | 100 | 100 | 100 | 100 | 100 |
| Inventive Packaging | 100 | 100 | 100 | 100 | 100 |

TABLE 10-continued

Percent Fiber Tear for Packaging Adhesive Compositions D-H and 2-4

| Packaging Adhesive | Fiber Tear (%) | | | | |
|---|---|---|---|---|---|
| | 57° C. | 23° C. | 4° C. | −7° C. | −18° C. |
| Adhesive 3 Inventive Packaging Adhesive 4 | 100 | 100 | 100 | 100 | 100 |

As shown in Table 10, Inventive Packaging Adhesives 2-4 each exhibit good adhesion (100%) at both low (−18° C.) and high (57° C.) temperatures, which is not achieved by many of the comparative packaging adhesives. This conclusion is further supported by the data presented in FIG. 6, which demonstrates the comparability of SAFT failure temperatures for both comparative and inventive packaging adhesives. Thus, it can be concluded that high softening point, low molecular weight hydrogenated polystyrene resins of the present invention can impart unique and unexpected properties when utilized as tackifying resins in adhesive compositions.

Example 8

Evaluation of Hot Melt Adhesives I-K and 5-7 with Dynamic Mechanical Analysis

Each of Comparative Nonwoven Adhesives I and J, Comparative Packaging Adhesive K, Inventive Nonwoven Adhesive 5, and Inventive Packaging Adhesives 6-8, described in Example 4, above, were analyzed via DMA. In addition, each adhesive was subjected to viscosity testing using a Brookfield viscometer at either 338° F. or 350° F., as noted. The results of these analyses for each of Comparative Adhesives I-K and Inventive Adhesives 5-7 are summarized in Table 11, below.

TABLE 11

Properties of Adhesives I-K and Adhesives 5-7

| Adhesive Composition | Viscosity (cp) | G' at 25° C. (dynes/cm² × 10⁶) | Tg (° C.) | Tan δ Value | Softening Point (° C.) |
|---|---|---|---|---|---|
| Comparative Nonwoven Adhesive I | 2400[1] | 2.03 | 18.38 | 2.48 | 70.35 |
| Comparative Nonwoven Adhesive J | 2300[1] | 1.16 | 20.37 | 3.40 | 68.38 |
| Inventive Nonwoven Adhesive 5 | 1800[1] | 1.01 | 18.37 | 3.01 | 68.35 |
| Comparative Packaging Adhesive K | 1402 | 579.9 | −29.45 | 0.13 | 90.39 |
| Inventive Packaging Adhesive 6 | 1100 | 588.9 | −11.58 | 0.21 | 77.0 |
| Inventive Packaging Adhesive 7 | 540 | 941.7 | −13.49 | 0.18 | 68.4 |
| Inventive Packaging Adhesive 8 | 5825 | 16.49 | −3.62 | 1.10 | 140.3 |

Notes:
[1]Measured at 338° F. All others measured at 350° F.

As illustrated in Table 11, Inventive Packaging Adhesives 5-8, which utilize low molecular weight, high softening point hydrogenated polystyrene resins as tackifying agents, exhibit comparable, or even better, adhesive performance, while still retaining desired stability, as compared to conventional adhesive compositions.

Example 9

Preparation of Adhesive Master Batch Formulations

Six adhesive master batches were prepared by combining one or more adhesive base polymers with an oil. Specific formulations of each of adhesive Master Batches (MB) 1-6 are summarized in Table 12, below.

TABLE 12

Compositions of Adhesive Master Batches 1-6

| Master Batch (MB) | Base Polymer 1 | | Base Polymer 2 | | Oil | |
|---|---|---|---|---|---|---|
| | Type[1] | Wt % | Type[1] | Wt % | Type | Wt % |
| MB 1 | KRATON D1161 | 87.0 | — | — | CALSOL 5550[2] | 13.0 |
| MB 2 | KRATON D1161 | 60.9 | KRATON D1118 | 26.1 | CALSOL 5550[2] | 13.0 |
| MB 3 | KRATON D1171 | 90.9 | — | — | CALSOL 5550[2] | 9.1 |
| MB 4 | KRATON D1118 | 33.3 | KRATON D1171 | 50.0 | SHELLFLEX 371[3] | 16.7 |
| MB 5 | KRATON G1652 | 83.3 | — | — | SHELLFLEX 371[3] | 16.7 |
| MB 6 | KRATON D1165 | 71.4 | — | — | KAYDOL[4] | 28.6 |

Notes:
[1]Commercially available from Kraton Polymers, Houston, TX.
[2]Commercially available from Calumet Lubricants, Indianapolis, IN.
[3]Commercially available from Shell Chemicals, Houston, TX.
[4]Commercially available from Amoco Chemical, Mahwah, NJ.

Master Batches 1-6 were then utilized to prepare several adhesive compositions, as described below in Examples 10 and 11.

Example 10

Preparation Hot Melt Adhesives Prepared from Adhesive Master Batches

Several hot melt adhesive compositions, including nonwoven and pressure sensitive adhesives, were formulated using Master Batches 1-6, described in Example 9, above. The components of each adhesive were combined in a Plasticorder Brabender mixer and the adhesives were prepared as described in Example 4, above. If needed, a second mixing pass was carried out in a one-pint unlined paint can equipped with a mechanical stirrer and a heating block set at 150° C. in order to ensure proper mixing of each adhesive. Specific formulations of each of Inventive Nonwoven Adhesives 8-10, Comparative Pressure Sensitive Adhesive K, and Inventive Pressure Sensitive Adhesives 11-19 are summarized in Table 13, below.

TABLE 13

Comparative and Inventive Hot Melt Adhesive Formulations Prepared with Master Batches 1-6

| Adhesive Composition | Master Batch # | Wt % | Polymer(s) Type | Wt % | Tackifying Resin/Agent Type | Wt % | Oil or Wax Type | Wt % | Antioxidant Type[12] | Wt % |
|---|---|---|---|---|---|---|---|---|---|---|
| Comparative Pressure Sensitive Adhesive K | — | — | KRATON 1161[1] | 43.1 | Tackifier I[3] | 49.6 | CALSOL 5550[9] | 6.5 | IRGANOX 1010 | 0.9 |
| Inventive Nonwoven Adhesive 8 | 5 | 21.7 | — | — | Tackifier 1 | 65.1 | SHELLFLEX 371[10] | 13.0 | IRGANOX 1010 | 0.2 |
| Inventive Nonwoven Adhesive 9 | 5 | 17.4 | EASTOFLEX P1023[2] | 13.0 | Tackifier 2 Tackifier J[4] | 43.4 13.0 | SHELLFLEX 371[10] | 13.0 | IRGANOX 1010 | 0.2 |
| Inventive Nonwoven Adhesive 10 | 6 | 28.5 | — | — | Tackifier 2 Tackifier K[5] Tackifier L[6] | 34.1 8.6 28.5 | KAYDOL[11] | 2.9 | IRGANOX 1010 | 0.1 |
| Inventive Pressure Sensitive Adhesive 11 | 1 | 46.4 | — | — | Tackifier 2 | 53.4 | — | — | IRGANOX 1010 | 0.2 |
| Inventive Pressure Sensitive Adhesive 12 | 1 | 46.4 | — | — | Tackifier 2 Tackifier L[6] | 30.2 23.2 | — | — | IRGANOX 1010 | 0.2 |
| Inventive Pressure Sensitive Adhesive 13 | 1 | 36.3 | — | — | Tackifier 2 | 50.8 | CALSOL 5550[9] | 12.7 | IRGANOX 1010 | 0.2 |
| Inventive Pressure Sensitive Adhesive 14 | 2 | 46.4 | — | — | Tackifier 2 Tackifier M[7] | 30.2 23.2 | — | — | IRGANOX 1010 | 0.2 |
| Inventive Pressure Sensitive Adhesive 15 | 2 | 46.4 | — | — | Tackifier 2 Tackifier N[8] | 30.2 23.2 | — | — | IRGANOX 1010 | 0.2 |
| Inventive Pressure Sensitive Adhesive 16 | 3 | 43.4 | — | — | Tackifier 2 | 56.4 | — | — | IRGANOX 1010 | 0.2 |
| Inventive Pressure Sensitive Adhesive 17 | — | — | Eastoflex 1060[2] | 64.1 | Tackifier 2 | 32.1 | CALSOL 5550[9] | 3.2 | IRGANOX 1010 | 0.2 |
| Inventive Pressure Sensitive Adhesive 18 | 4 | 45.4 | — | — | Tackifier 2 | 54.4 | — | — | IRGANOX 1010 | 0.2 |
| Inventive Pressure Sensitive Adhesive 19 | 1 | 37.0 | — | — | Tackifier 2 Tackifier L[6] | 25.9 25.9 | CALSOL 5550[9] | 11.1 | IRGANOX 1010 | 0.2 |

Notes:
[1]Commercially available from Kraton Polymer, Houston, TX.
[2]Commercially available from Eastman Chemical Company, Kingsport, TN.
[3]Commercially available from Eastman Chemical Company, Kingsport, TN as REGALREZ 1094.
[4]Commercially available from Eastman Chemical Company, Kingsport, TN as FORAL-85 E.
[5]Commercially available from Eastman Chemical Company, Kingsport, TN as ENDEX 160.
[6]Commercially available from Eastman Chemical Company, Kingsport, TN as PICCOTAC 1095.
[7]Commercially available from Eastman Chemical Company, Kingsport, TN as PICCOTAC 8095.
[8]Commercially available from Eastman Chemical Company, Kingsport, TN as PERMALYN 3100.
[9]Commercially available from Calumet Lubricants, Indianapolis, IN.
[10]Commercially available from Shell Chemicals, Houston, TX.
[11]Commercially available from Amoco Chemical, Mahwah, NJ.
[12]Commercially available from BASF, Florham Park, NJ.

Example 11

Analysis of Hot Melt Adhesives Prepared from Adhesive Master Batches

Both viscosity and DMA analyses were performed on Inventive Nonwoven Adhesives 8-10, Comparative Pressure Sensitive Adhesive K, and Inventive Pressure Sensitive Adhesives 11-19 summarized in Table 13, above. The results of these analyses for each adhesive are summarized in Table 14, below.

TABLE 14

Properties of Hot Melt Adhesives Prepared from Master Batches

| Adhesive Composition | Viscosity (cp) | G' at 25° C. (dynes/cm$^2$ × 10$^6$) | Tg (° C.) | Tan δ Value | Softening Point (° C.) |
|---|---|---|---|---|---|
| Comparative Pressure Sensitive Adhesive K | — | 1.10 | 4.37 | 2.11 | 70.4 |
| Inventive Nonwoven Adhesive 8 | 1800 | 65.88 | 34.34 | 2.88 | 72.4 |
| Inventive Nonwoven Adhesive 9 | 1700 | 3.83 | 20.39 | 2.25 | 112.3 |
| Inventive Nonwoven Adhesive 10 | 5200 | 14.43 | 32.35 | 5.32 | 70.4 |
| Inventive Pressure Sensitive Adhesive 11 | 61,900 | 1.37 | 16.38 | 2.57 | 94.4 |
| Inventive Pressure Sensitive Adhesive 12 | 70,600 | 1.32 | 4.39 | 1.26 | 108.4 |
| Inventive Pressure Sensitive Adhesive 13 | 17,900 | 0.56 | 2.40 | 3.11 | 86.3 |
| Inventive Pressure Sensitive Adhesive 14 | 58,100 | 1.05 | 14.40 | 2.53 | 102.4 |
| Inventive Pressure Sensitive Adhesive 15 | 41,300 | 1.06 | 12.38 | 1.58 | 94.4 |
| Inventive Pressure Sensitive Adhesive 16 | 39,600 | 1.46 | 12.37 | 2.49 | 90.4 |
| Inventive Pressure Sensitive Adhesive 17 | 4,600 | 2.96 | 0.39 | 1.67 | — |
| Inventive Pressure Sensitive Adhesive 18 | 28,700 | 1.16 | 10.36 | 2.24 | 94.35 |
| Inventive Pressure Sensitive Adhesive 19 | 18,600 | 0.53 | 2.88 | 3.11 | 96.4 |

As shown in Table 14, Inventive Pressure Sensitive Adhesives 11-19 exhibit good adhesive tack, as indicated by the high Tan δ values, while still maintaining a relatively low application temperature and good shear adhesion, as evidenced by the respective values of G' at 25° C.

Example 12

Hydrogenated Polystyrene Resins as Polymer System Modifiers

Several modified polymer systems were prepared by combining an amount of inventive Tackifier 2, prepared as described in Example 3 above, with a system of base polymers and an antioxidant (commercially available as IRGANOX 1010 from BASF, Florham Park, N.J.). Specific formulations of each of Modified Polymer Systems 1-5 are provided in Table 15, below.

TABLE 15

Compositions of Polymer System Modifiers utilizing Inventive Resin

| Modifier System | Master Batch # | Master Batch Wt % | Base Polymer(s) Type | Base Polymer(s) Wt % | Tackifier 2 Wt % | Antioxidant Wt % |
|---|---|---|---|---|---|---|
| Modified Polymer System 1 | 5 | 24.9 | EASTOFLEX E1060[2] | 24.9 | 49.8 | 0.2 |
| Modified Polymer System 2 | 5 | 24.9 | AFFINITY GA1950[1] | 24.9 | 49.8 | 0.2 |
| Modified Polymer System 3 | 5 | 24.9 | INFUSE 9507[1] | 24.9 | 49.8 | 0.2 |
| Modified Polymer System 4 | 5 | 49.8 | — | — | 49.8 | 0.2 |
| Modified Polymer System 5 | — | — | AP005 (PCCE)[2] | 49.8 | 49.8 | 0.2 |

Notes:
[1]Commercially available from Dow Chemical Company, Midland, MI.
[2]Commercially available from Eastman Chemical Company, Kingsport, TN.

Upon formulation, a DMA analysis was conducted on each of Modified Polymer Systems 1-5 and the results are summarized in Table 16, below.

TABLE 16

Results of Analysis of Modified Polymer Systems 1-5

| Modifier System | G' at 25° C. (dynes/cm$^2$ × 10$^6$) | Tg (° C.) | Tan δ Value | Softening Point (° C.) |
|---|---|---|---|---|
| Modified Polymer System 1 | 9.62 | 18.37 | 1.13 | 104.3 |
| Modified Polymer System 2 | 32.97 | 16.35 | 0.60 | 100.4 |
| Modified Polymer System 3 | 44.77 | 18.32 | 0.41 | 108.3 |
| Modified Polymer System 4 | 26.20 | 24.35 | 0.71 | 102.4 |
| Modified Polymer System 5 | 71.06 | −43.53 | 0.54 | 192.3 |

As shown in Table 16, single Tg values exhibited by each Modified Polymer System illustrate the compatibility of the inventive tackifier with the base polymers of each system. Further, the softening point of each Modified Polymer System is lower than the individual softening points of each of the base polymers, indicating improved (i.e., lower temperature) processability for each system.

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

We claim:

1. A process for producing a polystyrene homopolymer resin, said process comprising:
    (a) combining at least a solid acid catalyst, an inert solvent, and styrene to thereby form a reaction mixture; and
    (b) polymerizing at least a portion of said styrene in said reaction mixture to thereby produce said polystyrene homopolymer resin having a Ring & Ball softening point of at least 85° C. and not more than 110° C., a z-average molecular weight (Mz) from about 500 dalton to about 3,000 dalton, and a polydispersity index from about 1.1 to not more than 1.7,
    wherein said inert solvent has an aromatic hydrogen content of not more than 10 percent, as measured by proton NMR; and
    wherein said polystyrene homopolymer resin comprises styrenic moieties having not more than 5 weight percent of end-group moieties other than styrenic moieties.

2. The process of claim 1, wherein said inert solvent has an aromatic hydrogen content of not more than 5 percent, wherein said inert solvent comprises one or more cycloaliphatic hydrocarbon compounds.

3. The process of claim 1, wherein said weight ratio of said inert solvent to said styrene in said reaction mixture is at least 30:70.

4. The process of claim 1, wherein during said polymerizing of step (b), the temperature of said reaction mixture changes by not more than 5° C., wherein said average reaction temperature is at least 50° C.

5. The process of claim 1, wherein said polymerizing of step (b) is carried out at a reaction temperature of at least 40° C. and not more than 105° C.

6. The process of claim 1, wherein said combining of step (a) includes introducing said styrene into a pre-mixed slurry of said solid acid catalyst and said inert solvent to thereby form said reaction mixture.

7. The process of claim 1, wherein said reaction mixture comprises at least 3 weight percent and not more than 10 weight percent of said solid acid catalyst, based on the total weight of said styrene in said reaction mixture, wherein the moisture content of said solid acid catalyst is at least 1 weight percent and not more than 8 weight percent, based on the total weight of said solid acid catalyst.

8. The process of claim 1, further comprising, subsequent to said polymerizing of step (b), separating at least a portion of said polystyrene polymer from said reaction mixture to thereby provide a polystyrene product and a separated reaction mixture and recycling at least a portion of said separated reaction mixture for use in said combining of step (a).

9. The process of claim 1, further comprising, at least partially hydrogenating at least a portion of said polystyrene homopolymer resin subsequent to said polymerizing of step (b) to thereby provide an at least partially hydrogenated polystyrene polymer having an aromatic hydrogen content of not more than about 15 percent, as measured by proton NMR.

10. The process of claim 9, further comprising, utilizing at least a portion of said at least partially hydrogenated polystyrene polymer in an adhesive composition selected from the group consisting of hot melt pressure sensitive adhesives, hot melt nonwoven adhesives, and hot melt packaging adhesives.

11. The process of claim 1, wherein said solvent is an inert solvent having a proton NMR aromaticity of not more than 10 percent, wherein said inert solvent comprises tetramethylcyclohexane, trimethylcyclohexane, hexane, cyclohexane, heptanes, mineral spirits, or combinations thereof.

12. The process of claim 11, wherein the weight ratio of said inert solvent to said one or more monomers in said reaction mixture is at least 30:70.

13. The process of claim 1, wherein said polymerizing of step (b) is carried out at an average reaction temperature of at least 40° C. and not more than 105° C. and said reaction temperature changes by not more than 5° C. during said polymerizing of step (b).

14. The process of claim 1, further comprising, at least partially hydrogenating at least a portion of said polystyrene homopolymer resin subsequent to said polymerizing of step (b) to thereby provide an at least partially hydrogenated polystyrene polymer having an aromatic hydrogen content of at least about 2 percent, as measured by proton NMR.

* * * * *